United States Patent
Gane et al.

(10) Patent No.: US 10,544,544 B2
(45) Date of Patent: Jan. 28, 2020

(54) PROCESS FOR THE DEINKING OF COATED PAPER OR PAPERBOARD

(71) Applicant: Omya International AG, Oftringen (CH)

(72) Inventors: Patrick A. C. Gane, Rothrist (CH); Samuel Rentsch, Spiegel bei Bern (CH); Matthias Welker, Hésingue (FR); Catherine Jean Ridgway, Mühlethal (CH)

(73) Assignee: OMYA INTERNATIONAL AG, Oftringen (CH)

( * ) Notice: Subject to any disclaimer, the term of this patent is extended or adjusted under 35 U.S.C. 154(b) by 42 days.

(21) Appl. No.: 15/760,500

(22) PCT Filed: Oct. 10, 2016

(86) PCT No.: PCT/EP2016/074129
§ 371 (c)(1),
(2) Date: Mar. 15, 2018

(87) PCT Pub. No.: WO2017/063971
PCT Pub. Date: Apr. 20, 2017

(65) Prior Publication Data
US 2018/0258586 A1    Sep. 13, 2018

(30) Foreign Application Priority Data
Oct. 12, 2015    (EP) .................................... 15189268

(51) Int. Cl.
*D21C 5/02*    (2006.01)
*D21H 19/40*    (2006.01)
(Continued)

(52) U.S. Cl.
CPC ............. *D21C 5/027* (2013.01); *D21C 5/025* (2013.01); *D21H 19/40* (2013.01); *D21H 19/44* (2013.01);
(Continued)

(58) Field of Classification Search
None
See application file for complete search history.

(56) References Cited

U.S. PATENT DOCUMENTS 1,421,195 A     6/1922  Eyrich et al.
4,505,154 A *   3/1985  Wiesner .................. B41F 33/00
                                                        101/148

(Continued)

FOREIGN PATENT DOCUMENTS

DE        736450       6/1943
DE     19631150 A1     2/1998
(Continued)

OTHER PUBLICATIONS

Nano-minerals: Nanoclays, Sigma-Aldrich, no date,[online], retrieved from the Internet, [retrieved Jul. 18, 2019, <URL:https://www.sigmaaldrich.com/technical-documents/articles/materials-science/nanomaterials/nano-minerals-nanoclays.html>. (Year: 2019).*

(Continued)

*Primary Examiner* — Dennis R Cordray
(74) *Attorney, Agent, or Firm* — Heslin Rothenberg Farley & Mesiti P.C.

(57) ABSTRACT

A process for the deinking of a coated paper or paperboard is disclosed, the process comprises a step of providing a coating layer comprising a calcium- or magnesium-exchanged clay which is deposited on the paper or paperboard before the ink layer. In a further step said calcium- or magnesium-exchanged clay is activated and the paper is subsequently treated with water.

20 Claims, 10 Drawing Sheets

(51) Int. Cl.
*D21H 19/52* (2006.01)
*D21H 19/54* (2006.01)
*D21H 19/44* (2006.01)

(52) U.S. Cl.
CPC ............. *D21H 19/52* (2013.01); *D21H 19/54* (2013.01); *Y02W 30/648* (2015.05)

(56) References Cited

U.S. PATENT DOCUMENTS

| | | | |
|---|---|---|---|
| 4,867,844 A | | 9/1989 | Dessauer |
| 5,336,372 A | | 8/1994 | Cody et al. |
| 5,342,483 A | * | 8/1994 | Hwang .................. D21C 5/025 162/5 |
| 5,389,200 A | * | 2/1995 | Cody ..................... D21C 5/027 162/5 |
| 5,423,911 A | | 6/1995 | Coutelle et al. |
| 5,853,859 A | * | 12/1998 | Levy ..................... C09D 11/106 428/196 |
| 2012/0031573 A1 | | 2/2012 | Basilio et al. |

FOREIGN PATENT DOCUMENTS

| | | |
|---|---|---|
| EP | 0337771 A1 | 10/1989 |
| EP | 0512212 A1 | 11/1992 |
| EP | 0572037 A1 | 12/1993 |
| EP | 2366456 A1 | 9/2011 |
| EP | 2371766 A1 | 10/2011 |
| EP | 2447213 A1 | 5/2012 |
| EP | 2524898 A1 | 11/2012 |
| EP | 2840065 A1 | 2/2015 |
| WO | 2006123996 A1 | 11/2006 |
| WO | 2007081921 A2 | 7/2007 |
| WO | 2010077203 A1 | 7/2010 |
| WO | 2010147581 A1 | 12/2010 |
| WO | 2013123150 A2 | 8/2013 |
| WO | 2013142473 A1 | 9/2013 |

OTHER PUBLICATIONS

Smook, Handbook for Pulp & Paper Technologists, 2nd ed, Angus Wilde Publications, 1992, p. 287. (Year: 1992).*
International Search Report dated Dec. 22, 2016 for PCT/EP2016/074129.
The Written Opinion of the International Searching Authority dated Dec. 22, 2016 for PCT/EP2016/074129.

* cited by examiner

PROCESS FOR THE DEINKING OF COATED PAPER OR PAPERBOARD

CROSS-REFERENCE TO RELATED APPLICATIONS

This is a U.S. national phase of PCT Application No. PCT/EP2016/074129, filed Oct. 10, 2016, which claims priority to European Application No. 15189268.4, filed Oct. 12, 2015.

The present invention relates to a process for the deinking of coated paper or paperboard, which may be used for a multitude of inks, for example digital printing inks, laser printing inks, offset inks, flexographic inks and/or rotogravure inks.

In Switzerland alone in 2012 the overall consumption for printed papers was more than 700 000 tons (Source: homepage PAPIER SCHWEIZ). Even if paper is one of the renewable raw materials the recycling of paper is important for economic and environmental reasons. The efficient deinking of the printed paper is one of the most challenging steps during the recycling process.

US 2012/0031573 A1 refers to a composition for deinking waste paper, wherein the composition comprises: a surfactant and a hydrophobic kaolin-based deinking component.

U.S. Pat. No. 1,421,195 relates to a process for deinking paper which consists in subjecting the paper to an alkaline solution of bentonite.

WO 2010/147581 A1 refers to a process for deinking printed waste paper comprising the steps of: a) converting the printed waste paper to an aqueous pulp slurry in a pulper, where ink is detached from paper pulp, b) subjecting the pulp slurry to flotation in order to remove hydrophobic contaminants including ink from the pulp slurry, said flotation being carried out in the presence of a deinking chemical additive comprising modified silica obtained by treating hydrophilic silica particles with a hydrophobic organic liquid.

EP 0 512 212 A relates to a process for deinking wastepaper, which comprises (a) contacting wastepaper with an aqueous system which contains an agent selected from the group consisting of: (i) a mixture of one or more quaternary ammonium salts and one or more smectite-type clays; and (ii) one or more organically modified smectite-type clays; and (b) recovering deinked paper pulp from the aqueous system. EP 0 572 037 A1 refers to a coating pigment that can be fixed on printing media without the use of organic binders comprising at least one water swellable layer silicate in the amount of at least 30 weight percent based on the weight of the pigment wherein said coating pigment has a swelling volume of about 5 to about 30 ml based on a suspension of 2 g of coating pigment in 100 ml water and wherein said water swellable layer silicate has a zeta potential value of about −35 to about +10 mV.

WO 2013/123150 relates to a method for producing exfoliated clay platelets from a swellable clay material, comprising: providing an exfoliating agent comprising an anionic extractant, and exposing the swellable clay material to the exfoliating agent, wherein the exfoliating agent produces exfoliated clay platelets from the swellable clay material.

WO 2007/081921 A2 refers to a method of deinking printed waste paper that comprises ink and paper pulp, comprising the steps of: a) converting the printed waste paper to an aqueous pulp slurry in a pulper; b) contacting said aqueous pulp slurry with an inorganic substrate; c) contacting said aqueous pulp slurry with a deinking composition which comprises a nonionic surfactant, a fatty acid, or a mixture thereof; d) separating said ink in the aqueous pulp slurry; and e) recovering deinked paper pulp from the aqueous pulp slurry; wherein said deinking composition is optionally mixed with said inorganic substrate prior to step (b).

DE 196 31 150 A1 relates to a process involving treatment of a beaten substrate with aqueous caustic alkali, hydroxide peroxide, a surfactant and optionally water glass and separating the loosened printing ink by flotation, the surfactant used is an amphiphilic cationic surfactant with a hydrophilic lipophilic balance value of 8 to 13, the caustic alkali content is such that the pH does not exceed 9 and the water glass content is 0 to 0.5 wt.-%.

WO 2006/123996 refers to a process for deinking recycled fibres comprising a) providing an aqueous pulp suspension containing recycled fibres, printing ink and calcium carbonate; b) stabilizing the hardness of said pulp suspension by causing dissolution of calcium carbonate contained in said suspension or in an aqueous fluid added to said suspension; and c) subjecting the resulting pulp suspension to flotation to separate said printing ink from said suspension.

DE 736450 relates to a process for producing coated papers using a binding medium and a pigmented coating composition, wherein bentonite or a similar swelling clay is used as a binder in the coating composition.

The article "Novel surface preparation concept for improved deinking: Bringing digital, functional and water-based prints into the mainstream recycling process" concerning the deinking of printed products by coating paper with a specific exfoliation layer and further activation of said layer with sodium hydroxide causing the deinking was published in 2013 by Gane (Advances in Printing and Media Technology, Vol. XL, 2013 Ed. Nils Enlund and Mladen Lovrecek, ISSN 2225-6067, ISBN 978-3-9812704-4-0, 179-192.)

In view of the foregoing, the expert is still faced with the problem of efficient, ubiquitous and environment-friendly deinking of coated paper. Still today, deinking processes have several disadvantages. For example, not all kinds of ink release easily from the surface of the paper into the water, especially pigment inks adhere strong on the paper surface. Furthermore, for peeling the ink from the papers reagents are used that may disturb later purification steps, e.g. a strong base, like sodium hydroxide, can deactivate pH sensitive cationic collector agents, like modified polyethyleneimines. The activity of these collector agents is essential during a further purification by flotation.

There is still a need to provide deinking processes which may reduce or avoid one or more of the aforementioned technical drawbacks.

It is thus an object of the present invention to provide a process for the deinking of coated paper or paperboard which is very flexible concerning the kind of inks. Another object may also be seen in the provision of a more efficient process working under moderate conditions, for example with regard to the pH-value and allowing high flexibility concerning the methods and reagents for further purification of the ink-containing aqueous phase obtained after the deinking.

One or more of the foregoing and other problems are solved by the subject-matter as defined herein in the independent claims.

A first aspect of the present invention relates to a process for the deinking of coated paper or paperboard, said process comprising the steps of:
(i) providing a coated paper or paperboard comprising,
  (a) at least one layer consisting of a coating composition comprising,
    (a1) a calcium- or magnesium-exchanged clay,
    (a2) a binder,
  (b) at least one layer having a thickness in the range from 0.1 to 10 μm comprising ink,
(ii) activating the calcium- or magnesium-exchanged clay before or during step (iii) by,
  (A) carrying out step (iii) with water comprising monovalent ions selected from the group consisting of sodium, lithium, potassium, ammonium and mixtures thereof, and/or
  (B) providing in step (i) a binder (a2) that is soluble in water and comprises monovalent ions selected from the group consisting of sodium, lithium, potassium, ammonium and mixtures thereof, and/or
  (C) adding monovalent ions selected from the group consisting of sodium, lithium, potassium, ammonium and mixtures thereof in form of a salt before or during step (iii),
(iii) treating the coated paper or paperboard as provided in step (i) with water to obtain an aqueous suspension comprising at least ink, clay particles and
  a paper pulp or a paper residue, wherein layer (a) is deposited on the paper or paperboard before layer (b).

The process of the present invention can comprise a further step (iv) of separating the paper or paper board from the aqueous suspension obtained in step (iii). The present invention makes use of a calcium-exchanged nanoclay which is selected from the group consisting of bentonite, smectite, montmorillonite and mixtures thereof and preferably is bentonite.

The activating step (ii) according to the present invention can be,
  (A) carrying out step (iii) with water comprising an excess of monovalent ions selected from the group consisting of sodium, lithium, potassium, ammonium and mixtures thereof with respect to calcium or magnesium ions, wherein sodium ions are preferred and/or
  (B) providing in step (i) a binder (a2) that is soluble in water and comprises monovalent ions selected from the group consisting of sodium, lithium, potassium, ammonium and mixtures thereof with respect to calcium or magnesium ions, wherein sodium ions are preferred and/or
  (C) adding sodium ions in form of a salt selected from the group consisting of sodium chloride, sodium nitrate, sodium sulphate, sodium carbonate and/or mixtures thereof before or during step (iii).

The binder can be water soluble and can be selected from the group consisting of starch, carboxymethylcellulose, and mixtures thereof and preferably is carboxymethylcellulose, more preferably the water-soluble binder comprises an excess of sodium ions with respect to calcium or magnesium ions and/or the coating composition can comprise another binder which is water-dispersible, preferably a latex-binder.

The coated paper may comprise at least one layer (c) comprising 1 to 30 g/m$^2$, preferably from 5 to 20 g/m$^2$ and more preferably 6 to 15 g/m$^2$ of a calcium carbonate-comprising material.

The calcium carbonate-comprising material can be selected from ground calcium carbonate, precipitated calcium carbonate, surface-modified calcium carbonate, or a mixture thereof, and preferably is a natural ground calcium carbonate. Furthermore, the calcium carbonate-comprising material may be selected from natural calcium carbonate sources and preferably is selected from the group consisting of marble, limestone, chalk, dolomite, and mixtures thereof. The thickness of the at least one ink layer can be in the range from 0.75 to 5 μm and preferred in the range from 0.9 to 2.1 μm. The water applied in step (iii) may be selected from the list of tap water, deionized water and mixtures thereof, preferably is tap water, and more preferably is tap water comprising sodium ions, even more preferably is tap water comprising an excess of sodium ions with respect to calcium or magnesium ions.

During step (iii) of the process according to the present invention scraping of the surface of the paper or paperboard may be carried out. The content of the calcium-exchanged nanoclay (a1) in the composition as provided in step (i), may be in the range from 3 to 15 wt.-%, more preferably 5 to 12 wt.-% and most preferably from 5 to 10 wt.-% based on the total weight of the coating composition, and/or the coating weight of the at least one layer (a) is from 0.1 to 20 g/m$^2$, preferably 1 to 10 g/m$^2$. The content of the water-soluble binder (a2) in the composition as provided in step (i) may be in the range from 0.1 to 12 wt.-%, more preferably from 0.2 to 5 wt.-%, even more preferably from 0.3 to 2.0 wt.-% and most preferably from 0.5 to 1.5 wt.-% based on the solids weight of the coating composition. The ink in layer (b) may be a digital printing ink selected from the group consisting of ink- or dye-based inkjet inks, laser printing inks and/or toners, offset inks, flexographic inks, rotogravure inks and mixtures thereof.

The process of the present invention may further comprise the steps of
  (v) transferring the aqueous suspensions as obtained in step (iii) or (iv) to a flotation cell, and/or
  (vi) adding at least one collector agent to the aqueous suspensions as obtained in step (iii), (iv) or (v), and
  (vii) passing a flotation gas into the aqueous suspension formed in step (vi) to obtain a phase comprising water and a froth comprising clay and ink, and
  (viii) separating the froth as obtained in step (vii) from the water.

The at least one collector agent may be selected from the group consisting of modified polyethyleneimines, active and hydrophobic tensides, preferably xanthate or thio phosphates, alkyl sulphates, polyalkylenimines, primary amines, tertiary amines, quaternary amines, fatty amines, esterquats, polyesterquats, and imidazolines or quaternary imidazolium compounds, preferably quaternary imidazolium methosulphates, and most preferred are polyethyleneimines. The content of the at least one collector agent may be in the range from 0.001 to 50 wt.-% based on the total weight of the solids in the aqueous suspension as provided in step (iii) or (iv), preferably from 0.002 to 20 wt.-% based on the total weight of weight of the clay particles and optional other fillers, more preferably in the range from 0.05 to 0.8 wt.-% based on the total weight of the weight of the solids in the aqueous suspension as provided in step (iii) or (iv) and most preferably in the range from 0.02 to 0.1 wt.-%, based on the total weight of the weight of the solids in the aqueous suspension as provided in step (iii) or (iv).

Figure 1:
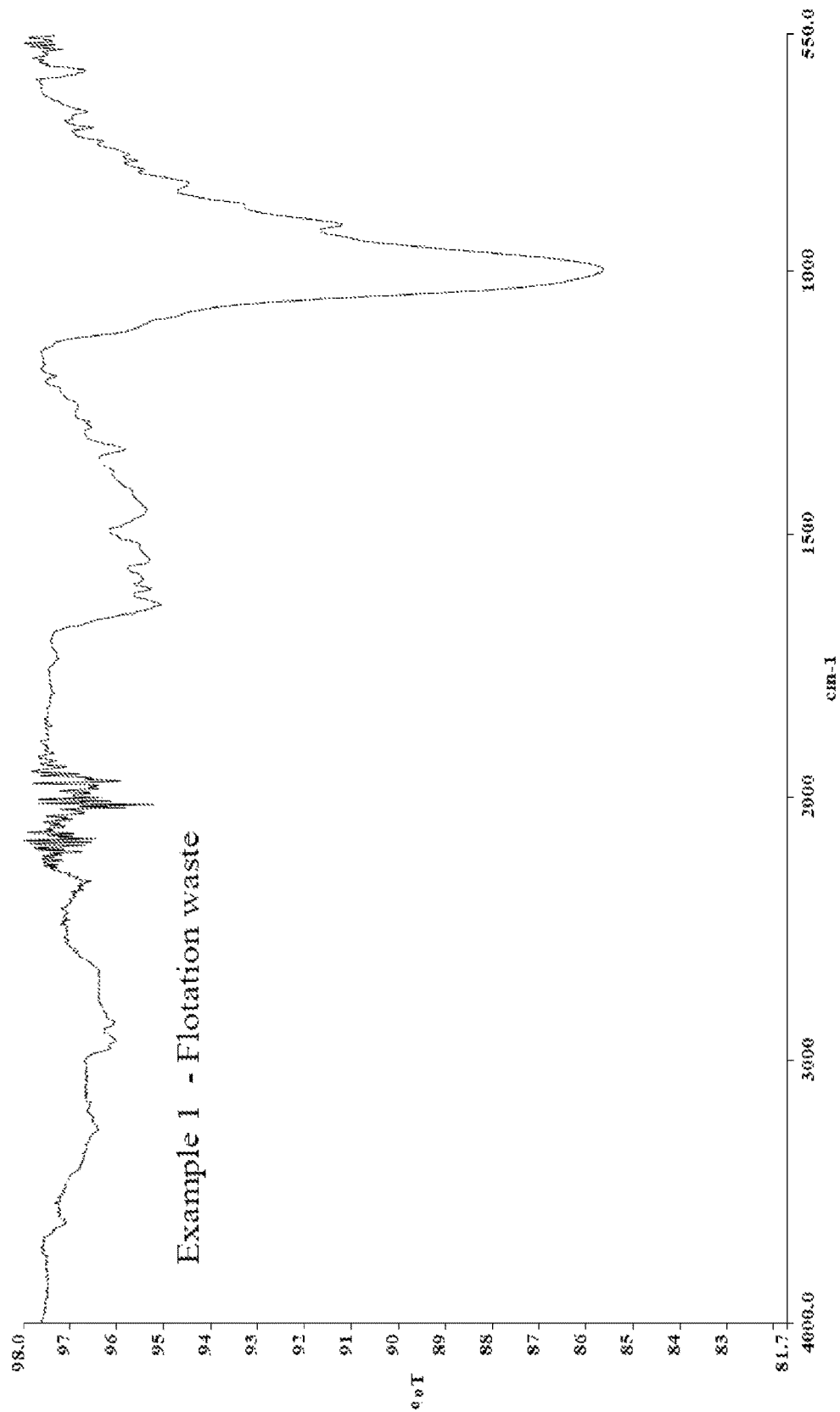
FIG. 1 shows FTIR spectra of one example waste faction in accordance with the invention.

It should be understood that for the purposes of the present invention, the following terms and expressions have the following meanings:

The term "deinking" in the meaning of the present invention refers to the removal of ink from paper pulp to obtain deinked paper pulp, whereby the paper pulp can be essentially free of ink e.g. <1 wt.-% ink remains on the paper pulp based on the starting content or the content of ink on the pulp is at least significantly reduced, such as by 50 to 80 wt.-% based on the ink content before the deinking.

The expression "calcium-exchanged clay" refers to a clay which is ion exchangeable and is essentially exchanged with calcium ions, e.g. more than 50%, preferably more than 90% of the cations are calcium ions.

The expression "water-soluble binder" in the meaning of the present invention refers to binders which are good water-soluble this means 10 g, preferably 50 g binder can be solved in 1 litre water.

The expression "water-dispersible binder" in the meaning of the present invention refers to binders whereby the solids/colloidal material is dispersed in the water phase without phase separation and without a significant (this means>30%) viscosity increase over a period of 3, preferably 7 days.

The term "latex" in the meaning of the present invention refers to aqueous dispersions of colloidal polymer particles. These particles may have a $d_{50}$ value in the range from 10 to 5 000 nm.

The term "filler" in the meaning of the present invention refers to substances which may be added to materials, such as polymers, elastomers, paints, or adhesives, e.g. to lower the consumption of more expensive materials or to improve material or mechanical properties of the resulting products. The person skilled in the art very well knows the fillers, typically mineral fillers, used in the respective field.

The expression "activating the calcium- or magnesium-exchanged clay" in the gist of the present invention means at least partially exchanging the calcium or magnesium ions with monovalent cations, preferably with sodium, and therewith transforming the clay at least partially into its water-swellable form.

"Layer (b)" comprising ink according to the present invention may be a single layer (solid tone) or when the ink has been applied as dots a series of small dimension layers.

A "natural calcium carbonate source" may be any natural material comprising calcium carbonate. Such materials comprise, for example, marble, limestone, chalk, dolomite, and the like.

Throughout the present document, the "particle size" of an alkaline earth metal carbonate-comprising material, or other particulate material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" though such a limited understanding is always included by the terms "obtained" or "defined" as a preferred embodiment.

The Coated Paper or Paperboard

According to step (i) of the process according to the present invention, a coated paper or paperboard is provided. Said coated paper or paperboard is characterized by that it comprises at least two layers (a) and (b), whereby layer (a) consists of a coating composition and layer (b) has a thickness in the range from 0.1 to 10 μm and comprises ink. The coating composition of layer (a) comprises (a1) a calcium- or magnesium exchanged clay and (a2) a binder.

In a preferred embodiment the coating composition of layer (a) comprises (a1) a calcium-exchanged clay, preferably a nanoclay, and (a2) a water-soluble binder.

In one embodiment the coated paper or paperboard has a weight in the range from 10 to 600 g/m², preferably 20 to 400 g/m². In another embodiment the coated paper has a weight in the range from 20 to 200 g/m², preferably 40 to 200 g/m².

In one embodiment of the present invention the calcium-exchanged clay of the coating composition in layer (a) is a nanoclay selected from the group consisting of bentonite, smectite, montmorillonite and mixtures thereof and preferably is bentonite.

In one embodiment the content of the calcium exchanged clay (a1) in the coating composition, is in the range from 3 to 15 wt.-%, more preferably 5 to 12 wt.-% and most preferably from 5 to 10 wt.-% based on the total weight of the coating composition. The total weight of the coating composition encompasses the solids and water.

The calcium exchange of the clay (a1) can be carried out during the preparation of the coating composition, e.g., by adding calcium hydroxide or calcium chloride, whereby calcium chloride is preferred.

Preferred binders in the coating composition in layer (a) are water-soluble binders like starch, carboxymethylcellulose, or mixtures thereof whereby carboxymethylcellulose is most preferred. The coating composition can also comprise water-dispersible binders like latex, and the coating may comprise a mixture of water-soluble and water-dispersible binders. According to another embodiment of the present invention the water-soluble binder comprises an excess of monovalent ions selected from the group consisting of sodium, lithium, potassium, ammonium and mixtures thereof with respect to calcium or magnesium ions, wherein sodium ions are preferred. The excess of these ions with respect to calcium or magnesium ions is in the range from 1 000:1 to 100 000:1.

In one embodiment the content of the binder (a2), preferably of a water-soluble binder, in the coating composition is in the range from 0.1 to 12 wt.-%, more preferably from 0.2 to 5 wt.-%, even more preferably from 0.3 to 2.0 wt.-% and most preferably from 0.5 to 1.5 wt.-% based on the solids weight of the coating composition.

In one embodiment the coating composition in layer (a) comprises bentonite and carboxymethylcellulose, preferably a carboxymethylcellulose having an excess of sodium ions with respect to calcium ions. The sodium content of the carboxymethylcellulose may be in the range from 1 to 40 wt.-% based on the overall weight of the carboxymethylcellulose, preferably 5 to 15 wt.-% based on the overall weight of the carboxymethylcellulose.

Before bringing the coating composition as layer (a) onto the paper or paperboard the composition comprises water, said water is evaporated during the coating process.

In another embodiment the coating composition in layer (a) comprises water soluble calcium or magnesium salts, preferably calcium chloride for carrying out the ion exchange of the clay in situ.

In one embodiment of the present invention the solids content of the coating composition before coating layer (a) is in the range from 1 to 60 wt.-%, preferably 2 to 20 wt.-% and more preferably 4 to 10 wt.-%.

In one embodiment according to the present invention the coating weight of layer (a) is in the range from 0.1 to 20 $g/m^2$, preferably from 1 to 10 $g/m^2$.

The thickness of layer (b) is in the range from 0.1 to 10 μm, preferably in the range from 0.75 to 5 μm and more preferably from 0.9 to 2.1 μm.

In one embodiment according to the present invention the coating weight of layer (b) is in the range from 0.5 to 20 $g/m^2$, preferably from 1 to 10 $g/m^2$ and more preferably from 1.5 to 4 $g/m^2$.

In one embodiment of the present invention the ink in layer (b) is a digital printing ink selected from the group consisting of ink- or dye-based inkjet inks, laser printing inks and/or toners, offset inks, flexographic inks, rotogravure inks and mixtures thereof.

In another embodiment the ink is black, blue, red, cyan, magenta or different inks with more than one of these colours are used.

The coated paper as provided in step (i) may comprise further layers. In one preferred embodiment the coated paper comprises at least one further layer (c) comprising a calcium carbonate-comprising material.

The coating weight of layer (c) is in one embodiment in the range from 1 to 30 $g/m^2$, preferably from 5 to 20 $g/m^2$ and more preferably 6 to 15 $g/m^2$. In another preferred embodiment layer (c) consists of a calcium carbonate-comprising material.

Furthermore, the coated paper as provided in step (i) may have further layers comprising a calcium carbonate-comprising material.

In one embodiment the calcium carbonate-comprising material is selected from ground calcium carbonate, precipitated calcium carbonate, surface-modified calcium carbonate, or a mixture thereof, and preferably is a natural ground calcium carbonate.

In some embodiments of the process according to the present invention, the calcium carbonate-comprising material is selected from natural calcium carbonate sources, preferably containing from 50 to 98 wt.-% of calcium carbonate, based on the total weight of said calcium carbonate-comprising material.

According to one embodiment, the calcium carbonate-comprising material contains at least 50 wt.-%, preferably at least 70 wt.-%, more preferably at least 80 wt.-%, even more preferably at least 90 wt.-%, and most preferably from 90 to 98 wt.-% of calcium carbonate, based on the total weight of said calcium carbonate-comprising material.

According to another embodiment, the calcium carbonate-comprising material is selected from the group consisting of marble, limestone, chalk, dolomite, and mixtures thereof.

In cases where the calcium carbonate is of synthetic origin, the calcium carbonate-comprising material may be precipitated calcium carbonate (PCC). A PCC in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP 2 447 213 A1, EP 2 524 898 A1, EP 2 371 766 A1, EP 2 840 065 A1, or WO 2013/142473 A1.

According to one embodiment, the calcium carbonate-comprising material has a weight median particle size $d_{50}$ ranging from 5.0 to 600.0 μm and preferably from 50.0 to 300.0 μm.

The layer comprising the coating composition (a) is preferably the under most layer this means directly adjacent to the surface of the uncoated paper. It is essential that the ink layer (b) is arranged above layer (a), however it is possible that further layers, e.g. a layer comprising a calcium carbonate-comprising material, are arranged between layers (a) and (b). But the ink layer (b) cannot be arranged between the surface of the uncoated paper and layer (a).

Preferred arrangements of layers on the coated paper are given below:
Paper-layer (a)-layer (b)
Paper-layer (a)-layer (c)-layer (b)
Paper-layer (a)-layer (c)-layer (c)-layer (b)
Paper-layer (a)-layer (c)-layer (a)-layer (b)

The arrangement "Paper-layer (a)-layer (c)-layer (a)-layer (b)" allows to recycle the calcium carbonate-comprising material in layer (c).

Process Step (ii)

According to the present invention the activation of the calcium- or magnesium-exchanged clay can be achieved by the following means:

(A) carrying out step (iii) with water comprising monovalent ions selected from the group consisting of sodium, lithium, potassium, ammonium ions and mixtures thereof, and/or (B) providing in step (i) a water-soluble binder (a2) comprising monovalent ions selected from the group consisting of sodium, lithium, potassium, ammonium ions and/or mixtures thereof, and/or (C) adding monovalent ions selected from the group consisting of sodium, lithium, potassium, ammonium ions and mixtures thereof in form of a salt.

The activation is achieved by at least partially exchanging the calcium or magnesium ion with a monovalent cation, preferably with sodium, and transforming the clay into its water-swellable form.

A similar concept may use a clay exchanged with a divalent cation different from calcium or magnesium, or mixtures of divalent cations including calcium and magnesium and exchange these cations with a monovalent cation like e.g. lithium or sodium.

According to one embodiment of the present invention step (iii) is carried out with water having a sodium content in the range from 10 to 10 000 mg/l, preferably 10 to 1 000 mg/l and more preferably 10 to 300 mg/l.

In another embodiment of the present invention the water as provided in step (iii) has an excess of sodium ions with respect to calcium ions in the range from 2:1 to 1 000 to 1.

According to a further embodiment the water applied in step (iii) is tap water, and preferred is tap water comprising an excess of sodium ions with respect to calcium or magnesium ions in the range from 2:1 to 1 000:1.

In one embodiment the coating composition in layer (a) comprises bentonite and carboxymethylcellulose, preferably a carboxymethylcellulose having an excess of sodium ions with respect to calcium or magnesium ions. The sodium content of the carboxymethylcellulose may be in the range from 1 to 40 wt.-% based on the overall weight of the carboxymethylcellulose, preferably 5 to 15 wt.-% based on the overall weight of the carboxymethylcellulose.

According to still another embodiment the coating composition comprises a water-soluble binder, preferably a carboxymethylcellulose, having an excess of sodium ions with respect to calcium ions in the range from 10:1 to 100 000 to 1.

In case that monovalent ions selected from the group consisting of sodium, lithium, potassium, ammonium ions and mixtures thereof are added in form of a salt before or during step (iii) it is preferred that the salt with respect to the amount of the calcium exchanged clay is added in an excess of 50%, preferably 150% with respect to the mass of the sodium salt and the calcium exchanged clay. Preferred salts are sodium salts selected from the group consisting of sodium chloride, sodium nitrate, sodium sulphate and sodium carbonate.

It is also possible to carry out step (ii) by applying a combination of means (A) to (C), such as (A) and (B), (A) and (C), (B) and (C) or (A), (B) and (C).

The treatment with sodium hydroxide for activating the calcium-exchanged clay is not a preferred option, since a strong base, like sodium hydroxide, can deactivate cationic collector agents, like polyethyleneimines. The activity of these collector agents is essential during a further purification by flotation.

Without being bound by any theory it is believed that the presence of monovalent ions like sodium ions is sufficient for causing the deinking of the paper or paperboard for some kinds of clay. An excess of these monovalent ions (especially sodium ions) with respect to calcium or magnesium ions might be not mandatory but is preferred. There might exist a rapid equilibrium between the calcium form (non-swollen) and the sodium form (swollen form) of the clay. Transforming the clay into the swollen form for a short time can be sufficient for effecting the exfoliation of the layer (a).

Process Step (iii)

According to step (iii) of the present invention the coated paper or paperboard as provided in step (i) is treated with water to obtain an aqueous suspension comprising at least ink, clay particles and a paper pulp or paper residue.

The water effects an exchange of the cation in the calcium- or magnesium-exchanged clay, whereupon swelling of the clay occurs and effects detachment of layer (a) from the coated paper or paperboard.

In one embodiment mechanical scraping of the surface of the paper is carried out during step (iii) to assist the detachment of layer (a) from the paper. Consequently, also layers (b) and if present other layers arranged on top of layer (a) are removed from the paper pulp or paper residue. According to still another embodiment ultrasonication is carried out during step (iii). In another embodiment mechanical scraping and ultrasonication are carried out during step (iii) for supporting the detachment of layer (a).

The treatment step (iii) can be carried out at a temperature in the range from 0 to 120° C., preferably from 10 to 100° C. and more preferably from 15 to 40° C.

Optional Process Steps

The process according to the present invention may comprise further steps. According to one embodiment the processes comprises a step of separating the paper or paperboard from the aqueous suspension obtained in step (iii). Mechanical separation steps like separation by using a sieve or a centrifuge or sedimentation are preferred.

According to still another embodiment of the process according to the present invention the aqueous suspension obtained in step (iii) or (iv) is subjected to a flotation process for removal of the ink from the water. The ink is transported out of the water together with the clay.

The process may comprise the following further steps for carrying out the flotation:

(v) transferring the aqueous suspensions as obtained in step (iii) or (iv) to a flotation cell, and/or
(vi) adding at least one collector agent to the aqueous suspensions as obtained in step (iii), (iv) or (v), and
(vii) passing a flotation gas into the aqueous suspension formed in step (vi) to obtain a phase comprising water and a froth comprising nanoclay and ink, and
(viii) separating the froth as obtained in step (vii) from the water.

The at least one collector agent used for imparting hydrophobicity to the impurity fractions may be any means known to the skilled person.

The term "at least one" collector agent in the meaning of the present invention means that the collector agent comprises, preferably consists of, one or more collector agents.

In one embodiment of the present invention, the at least one collector agent comprises, preferably consists of, one collector agent. Alternatively, the at least one collector agent comprises, preferably consists of, two or more collector agents. For example, the at least one collector agent comprises, preferably consists of, two or three collector agents.

Preferably, the at least one collector agent comprises, more preferably consists of, one collector agent.

For example, the at least one collector agent is selected from the group consisting of modified polyethyleneimines, active and hydrophobic tensides, preferably xanthate or thio phosphates, alkyl sulphates, polyalkylenimines, primary amines, tertiary amines, quaternary amines, fatty amines, esterquats, polyesterquats, and imidazolines or quaternary imidazolium compounds, preferably quaternary imidazolium methosulphates, and most preferred are modified polyethyleneimines.

In one embodiment the modified polyethyleneimine is a hydrophobically modified polyethyleneimine, wherein the polyetyleneeimine is hydrophobically modified by replacement of all or part of the hydrogens of their primary and/or secondary amino groups by a functional group R, where R comprises a linear or branched or cyclic alkyl and/or aryl group and contains 1 to 32 carbon atoms. Such modified polyethyleneimines are, e.g., described in EP 2 366 456 A1.

The solids content of the aqueous suspension as provided in step (iii) is preferably in the range from 0.1 to 75 wt. %, preferably from 0.5 to 40 wt.-%, more preferably from 1 to 20 wt.-%.

The solids content of the aqueous suspension as provided in step (iv) is preferably in the range from 0.01 to 75 wt. %, preferably from 0.5 to 40 wt.-%, more preferably from 1 to 20 wt.-%.

Additionally or alternatively, the content of the at least one collector agent is in the range from 0.001 to 50 wt.-% based on the total weight of the solids in the aqueous suspension as provided in step (iii) or (iv), preferably in the range from 0.002 to 20 wt.-% based on the total weight of the solids in the aqueous suspension as provided in step (iii) or (iv), more preferably from 0.05 to 0.8 wt.-% based on the total weight of the solids in the aqueous suspension as provided in step (iii) or (iv) and most preferably in the range from 0.02 to 0.1 wt.-%, based on the total weight of the solids in the aqueous suspension as provided in step (iii) or (iv).

The flotation gas is preferably air.

It is preferred that the flotation gas feature a bubble size in the suspension of between 0.01 and 10.0 mm.

The gas hold up is preferably between 5 to 35%.

During the flotation the aqueous suspension preferably has a temperature of between 5 and 130° C., more preferably of between 10 and 100° C., even more preferably of between 15 and 95° C. and most preferably of between 20 and 95° C. The choice of the temperature highly depends on the choice of the at least one collector agent.

It is appreciated that the process involves an indirect flotation step leading to the formation of a froth containing ink and clay particles and an aqueous suspension or solution bearing phase. If the coated paper comprises one or more further layers (c) comprising a calcium carbonate-comprising material, it is preferred that the process involves an indirect floatation step leading to the formation of a froth containing ink and clay particles and an aqueous suspension comprising the calcium carbonate-comprising material. The calcium carbonate-comprising material may be further purified by e.g. a direct flotation process leading to the formation of a froth containing the calcium carbonate and an aqueous solution or by using a centrifuge.

In one embodiment, one or more additives selected from the group consisting of pH-adjusting agents, solvents, foaming agents such as isopropanol and polyelectrolytes are added before step (vii), preferably the content of these additives is in the range from 0.0005 to 1.0 wt.-%, more preferably from 0.001 to 0.5 wt.-% and most preferably in the range from 0.001 to 0.1 wt.-% based on the total weight of the solids in the aqueous suspension obtained after step (iii) or (iv).

Experimental Section

The scope and interest of the invention may be better understood on basis of the following examples which are intended to illustrate embodiments of the present invention. However, they are not to be construed to limit the scope of the claims in any manner whatsoever.

1 Measurement Methods

In the following, measurement methods implemented in the examples are described.

IR Spectroscopy

IR spectra of powders were measured on a Perkin-Elmer spectrometer with a universal ATR sampling accessory.

UV-VIS Spectroscopy

UV-VIS spectra of aqueous solutions/suspensions were recorded at room temperature on a Lambda 2 UV/Vis spectrometer (Perkin-Elmer, USA, scan speed 240 nm/min) using a Perkin-Elmer UV-Vis cell (light path=10 mm).

Spectrophotometric Colour Evaluation

The spectrophotometric colour evaluation was carried out using a Techkon SP810 Lambda spectrophotometer (measurement mode: D2 CMYK, DinE, Illuminant: D65, observer: 10°)

Solids Content

The suspension solids content (also known as "dry weight") was determined using a Moisture Analyser MJ33 (Mettler-Toledo, Switzerland), with the following settings: drying temperature of 150° C., automatic switch off if the mass does not change more than 1 mg over a period of 30 s, standard drying of 1 to 10 g of suspension.

Ash Content

The ash content in wt.-% based on the total weight of the sample, was determined by incineration of a sample in an incineration crucible which was put into an incineration furnace at 570° C. for 2 hours. The ash content was measured as the total amount of remaining inorganic residues.

TGA

Thermogravimetric analysis (TGA) was performed using a Mettler Toledo TGA/DSC1 STARe system based on a sample of 5 to 500 mg and scanning temperatures from 30 to 1 000° C. at a rate of 25° C./minute, under an air flow of 80 mL/min and a nitrogen gas flow of 20 ml/min for balance protection.

X-ray Fluorescence Analysis (XRF)

For carrying out the XRF-measurement the samples were grinded to fine powder and then put into a plastic cassette on a 6 μm spectrolene film. The elemental composition of the sample was analysed under helium by sequential, wavelength dispersive X-ray fluorescence (using an ARL™ PERFORM'X X-ray fluorescence spectrometer, Thermo Fisher Scientific, Inc., USA). The calculation of the elements was made by means of semi-quantitative calibration (UNIQUANT).

pH pH was measured on a Mettler-Toledo Seven-Multi device. The pH of a suspension was measured at 24° C.±3° C. using a Mettler Toledo Seven Easy pH meter and a Mettler Toledo InLab® Expert Pro pH electrode (Mettler Toledo, Switzerland). A three point calibration (according to the segment method) of the instrument was first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 s).

Ink Layer Thickness

The thickness of the ink layer was evaluated by light microscope. The micrographs were taken under light microscope using transmitted light and the brightfield method was applied to get a proper illumination of the sample. The thickness of the ink layer was measured at 4 different spots on each image. The size of the pixel was 0.13 µm.

2 Paper Preparation

The tap water used in the following trials contained 15 ppm sodium ions.

2.1 Preparation of Coating Compositions

Coating Composition 1: Ca-Exchanged Bentonite Coating Composition

A Ca-exchanged bentonite coating colour was prepared from Na-Bentonite (Optigel CK, Rockwood additives) for use in the coating composition according to Table 1.

TABLE 1

Coating composition 1 (=CC1), (Ca-exchanged bentonite coating composition).

| Compound (tradename/supplier) | parts dry w/w % based on 100 parts by weight of clay |
|---|---|
| Bentonite (Optigel CK, Rockwood additives) | 100 |
| Carboxy Methyl Cellulose (Finnfix 10, CP, Kelco) | 1.6 |

A 3 wt.-% solids content sodium form of bentonite was prepared. The bentonite was first dispersed in tap water (38° C.), to aid the swelling of the tactoids. Additional sodium hydroxide was added to obtain a pH of 11. The mixture was stirred for 15 minutes to produce an even consistency. In the resulting gel form the dispersed bentonite platelets are surrounded by $Na^+$ ions. The gel was allowed to age overnight (18 h) to avoid further post makedown thickening. To initiate the calcium ion exchange effect, calcium chloride was added. When adding $Ca^{2+}$ ions to the mixture, an intercalation between the bentonite platelets occurs. When adding calcium chloride step by step, the gel finally collapsed and it became fluid. This phenomenon occurred when the pH was between 8 and 9. The fluid bentonite was filtered under vacuum using blue ribbon 589/3 (<2 µm) filter paper to increase the solids content (8.5 to 12.0 wt.-%). The bentonite was rinsed with tap water during this process. In preparing the coating composition Carboxy Methyl Cellulose with 10 wt.-% dry solids content was added to re-thicken the mixture. The shade of the obtained coating colour was off-white-grey, and reflects the non-optimal light scattering cross-section of the bentonite in water. The final solids content was 7.1 wt.-%.

Coating Composition 2: GCC Colour for Top Coating

TABLE 2

Coating composition 2 (=CC2).

| Compound (tradename/supplier) | Amount (solids content/parts per hundred based on 100 parts by weight of pigment) |
|---|---|
| GCC (Hydrocarb 95, Omya) | 77.9 wt.-%/100 |
| Polyvinyl alcohol | 25 wt.-%/0.2 |
| Binder (Styronal D628/BASF) | 60 wt.-%/9 |
| Thickening agent (Rheocarb 131/Arkema) | 24 wt.-%/0.4 |
| Optical brightening agent (OBA-APA/Tetra Sulpho) | 100 wt.-%/0.5 |

Water has been added to adjust the solids content to 47.8 wt.-%.

To obtain coating composition 2, polyvinylalcohol, Styronal D628, Rheocarb 131 and OBA-APA/Tetra Sulpho were successively added to a GCC slurry, and homogenized at room temperature with a Pendraulik LD50 high speed disperser (50 mm diam. dispersing disc, speed approx. 1 250 rpm) for 2 to 5 minutes after each component had been added.

2.2 Preparation of Coated Papers

Paper 1 is a commercially available A4 copy-grade paper (Cento Plus, 80 g/m², uncoated)

Paper 2 is a SAPPI pre-coated with ground calcium carbonate A4 paper (100% GCC pre-coating)

Paper 3 is an uncoated copy-grade paper (80 g/m2, paper 1) coated with coating composition 1 on a C-Coater (coater speed 3, rod type 5), coating weight FS: 3.6 g/m²

Paper 4 is a SAPPI GCC pre-coated paper (paper 2) coated with composition 1 on a C-Coater (coater speed 3, rod type 5), and then cut to A4 format, coating weight FS: 3.9 g/m²

Paper 5 is paper 3, which was further coated with coating composition 2 on a C-Coater (coater speed 3, rod type 3), and then cut to A4 format, coating weight FS: 8.5 g/m²

2.3 Paper Printing

Two inkjet printing systems were used: Canon Pixma iP4850 (Chromalife 100 dye-based ink; print head system Bubble Jet, thermal InkJet; print head: Fine Print Head 1 pl, 512 nozzle k,Y,PBK+1536 nozzle c,m; print settings: standard, high resolution paper; Print resolution: 9 600×2 400 dpiHP OfficeJet Pro 8000 Enterprise (Pigment-based ink; print head system Bubble Jet, thermal InkJet; print head: 2 Printhead à 2112 nozzle; print settings: normal, optimal; Print resolution: 4 800×1 200 dpi)

In addition, offset printing was done on an ISIT system (printing of 210×21 mm² bands) with a Skinnex cyan ink.

Format 1 is 185×288 mm² rectangle printout in cyan colour on an A4 paper sheet for a total printed area of 532.8 cm².

Format 2 is an arrangement of 6 cyan rectangle printouts (24×95 mm²), 6 Magenta rectangle printouts (24×95 mm²), and 5 black rectangle printouts (24×190 mm²) on a A4 paper sheet for a total printed area of 501.6 cm².

Format 3 is composed of 7 printed strips (ca. 210×21 mm², printed with Skinnex cyan ink).

TABLE 3

Overview printed papers.

| Sample ref | Paper used | Coating layer 1 | Coating layer 2 | Coating layer 3 | Ink type | Printing format | No. of ink layers |
|---|---|---|---|---|---|---|---|
| Printed paper 6 | Paper 2 | CC2 | — | — | Pigment | Format 2 | 1 |
| Printed paper 7 | Paper 2 | CC2 | — | — | Dye | Format 2 | 1 |
| Printed paper 8 | Paper 2 | CC2 | — | — | Pigment | Format 2 | 3 |
| Printed paper 9 | Paper 2 | CC2 | — | — | Offset | Format 3 | 3 |
| Printed paper 10 | Paper 4 | CC2 | CC1 | — | Pigment | Format 1 | 1 |
| Printed paper 11 | Paper 4 | CC2 | CC1 | — | Pigment | Format 2 | 1 |
| Printed paper 12 | Paper 4 | CC2 | CC1 | — | Offset | Format 3 | 1 |
| Printed paper 13 | Paper 4 | CC2 | CC1 | — | Pigment | Format 1 | 3 |
| Printed paper 14 | Paper 4 | CC2 | CC1 | — | Pigment | Format 2 | 3 |
| Printed paper 15 | Paper 4 | CC2 | CC1 | — | Offset | Format 3 | 3 |
| Printed paper 16 | Paper 5 | CC2 | CC1 | CC2 | Pigment | Format 2 | 1 |
| Printed paper 17 | Paper 5 | CC2 | CC1 | CC2 | Dye | Format 2 | 1 |

Printing of Paper 9

The paper used was an 80 g/m² SAPPI pre-coated (GCC) paper, which was printed on the ISIT (Ink surface interaction tester) with an offset ink (3 times). 1 sheet of paper 2 was cut in 7 paper bands, and printed on the ISIT with cyan offset ink (3 times, 1 h drying time between two successive layers).

Printing of Paper 13

The paper was printed with inkjet pigment ink on format 1 and then left to dry for 10 minutes. Afterwards the printing was performed again on top of the $1^{st}$ layer, and, after 10 minutes drying, a $3^{rd}$ ink layer was printed.

Printing of Paper 14

The paper was printed with inkjet pigment ink on format 2, then left to dry for 10 minutes. The printing was then performed again on top of the $1^{st}$ layer, and, after 10 minutes drying, a $3^{rd}$ ink layer was printed.

Printing of Paper 15

The paper used was a SAPPI pre-coated (GCC) paper, which was coated with a bentonite layer and printed on the ISIT (Ink surface interaction tester) with an offset ink (3 times).

1 A4 sheet of paper was cut vertically in 7 pieces, and printed on the ISIT with cyan offset ink (Novavit 4×800 SKINNEX Cyan, 3 consecutive printed layers on top of each other, 1 h drying time between two successive layers).

3 Deinking and Floatation with Pigmented Ink

The tap water used in the following trials contained 15 ppm sodium ions. The modified polyethyleneimine polymer that has been used in the following trials has a polyethyleneimine backbone with a molecular weight ($M_w$) of 5 000 g/mol and is modified with a saturated C5 fatty acid as described in EP 2 366 456 A1.

EXAMPLE 1

Deinking and Flotation of Printed Paper 11 (Inventive Example)

Step A): Ink Desorption from Paper

One A4 printed paper 11 sheet was dipped in a beaker (5 L) in 2.2 L deionized water and was left to stay without particular stirring during 10 minutes. The ink "slipped" from the sheet in large particles and the black colour was completely removed, whereas blue and red schemes leave slightly red/pink colour traces on the paper. Afterwards, the decolourized paper was removed from the beaker and the water with ink particles in suspension were directly used for flotation purification. The pH of the obtained mixture was 9.1.

Step B): Purification by Flotation

Flotation was performed on an Outotec Labcell flotation device. 2 L of the aqueous suspension obtained in step A) were placed in the flotation flask. The mixture was stirred for 2 minutes under air flow (55 Hz, 1 650 rpm, air flow: 4 to 6 l/min). After that period of time, a modified polyethyleneimine polymer (1.0 g, 7.5 wt.-% solid content) was added. The air flow was stopped and the mixture was stirred for additional 2 minutes. The air flow was then turned on for 20 minutes (4 to 6 l/min). A pink/purple coloured foam appeared, and the water suspension became clearer after 2 minutes. After that period of time, the water sample was visually free from coloured particles. The flotation was stopped, and the different fractions (removed foam and clean water) were analysed.

Waste (removed foam fraction): dark purple, V=250 ml, pH=8.3 Clean water: colourless with trace amount of particles in suspension, V=1.75 l, pH=8.3.

Step C: Filtration

The waste fraction was filtered by using a Buchner funnel (Whatman grade 589/3 qualitative filtration paper), washed with deionized water and dried under reduced pressure at 90° C. for 4 h. 80 mg of a dark powder were recovered and analysed.

Analyses

IR

The waste fraction showed a Peak at 1 000 cm⁻¹ that can be attributed to the bentonite (Si—O bond, see FIG. 1).

UV/Vis

Figure 2:
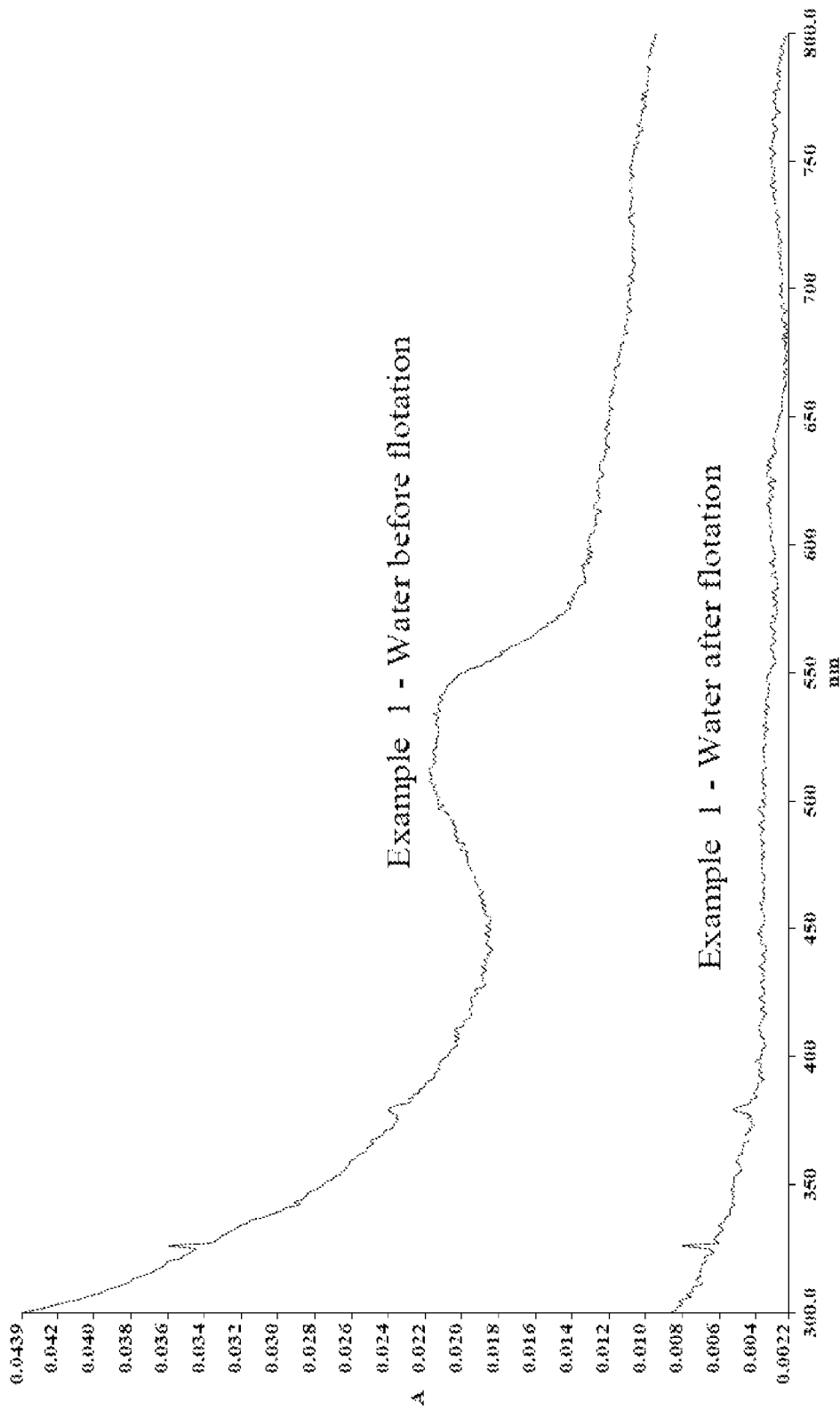
FIG. 2 shows the comparative UV-VIS spectra of one example of an aqueous suspension (filtered), both before and after flotation, in accordance with the invention.

FIG. 2 shows the UV-vis spectra of the aqueous suspension before and after the flotation (once filtered).

Spectrophotometry

Cyan density was measured on the blue-printed portions

Magenta density was measured on the red-printed portions

Black density was measured on the black-printed portions

Given values are an average of 10 measurements.

TABLE 4

Results of spectrophotometric evaluation.

| Sample | Cyan | Magenta | Black |
|---|---|---|---|
| Example 1/Printed paper 11 before step A | 1.3321 | 1.299 | 1.5475 |
| Example 1/Printed paper 11 after step A | 0.0264 | 0.1018 | 0.0231 |

Composition Analysis

The compositions of the different fractions of materials were analysed using the following techniques:
Determination of the ash content
Thermogravimetric analysis
Semiquantitative XRF-analysis (UNIQUANT)
FTIR-spectra
The results are summarized in Tables 5 and 6 below.

TABLE 5

Composition of different fractions.

| Fraction | Ash content [wt.-%] | Composition/Remarks |
|---|---|---|
| Printed paper 11 before step A | 31.0 | Mainly paper (cellulose), ash contains mainly CaCO$_3$ (25 wt.-%), Al-silicates (5 wt.-%) |
| Printed paper 11 after step A | 30.4 | Mainly paper (cellulose), ash contains mainly CaCO$_3$ (26 wt.-%), some Al-silicates (4 wt.-%) |
| Waste collected after step B flotation | 57 | Mainly inorganics, especially Al-Silicates (45 wt.-%), CaCO$_3$ (10 wt.-%) |

TABLE 6

Composition of different fractions.

| | Printed paper 11 before step A | Printed paper 11 after step A | Waste collected after step B flotation |
|---|---|---|---|
| CaO | 13.9 wt.-% | 13.7 wt.-% | 2.95 wt.-% |
| MgO | 0.95 wt.-% | 0.91 wt.-% | 2.75 wt.-% |
| Al$_2$O$_3$ | 1.38 wt.-% | 1.13 wt.-% | 9.45 wt.-% |
| SiO$_2$ | 3.38 wt.-% | 2.42 wt.-% | 32.6 wt.-% |
| Fe$_2$O$_3$ | 0.25 wt.-% | 0.11 wt.-% | 1.57 wt.-% |
| TiO$_2$ | 0.04 wt.-% | 0.02 wt.-% | 0.14 wt.-% |
| SO$_3$ | 0.06 wt.-% | 0.04 wt.-% | 0.18 wt.-% |
| Na$_2$O | 0.20 wt.-% | — | 0.21 wt.-% |
| Others | 0.08 wt.-% | 0.10 wt.-% | 0.05 wt.-% |
| TGA 30-250° C. (→water) | 0.17 wt.-% | 0.14 wt.-% | 7.0 wt.-% |
| TGA 250-1000° C. (→CO$_2$) | 10.54 wt.-% | 11.74 wt.-% | |
| Organic content | 69.0 wt.-% | 69.6 wt.-% | 43 wt.-% |

EXAMPLE 2

Deinking and Flotation of Printed Paper 16 (Inventive Example)

Step A): Ink Desorption from Paper

One A4 printed paper 16 sheet was dipped in a beaker (5 l) in 2.2 l deionised water and was left to stay without particular stirring during 10 minutes. The ink "slipped" from the sheet in very large platelets and the black colour was completely removed, whereas blue and red schemes leave slightly red/pink colour traces on the paper. Afterwards, the decolourized paper was removed from the beaker and the water with ink particles in suspension (slightly red in colour and trouble aspects) were directly used for flotation purification. The pH of the obtained mixture was 9.1.

Step B): Purification by Flotation

Flotation was performed on an Outotec Labcell flotation device. 2 l of the aqueous suspension obtained in step A) were placed in the flotation flask. The mixture was stirred for 2 minutes under air flow (55 Hz, 1 650 rpm, air flow: 4 to 6 l/min). After that period of time, a modified polyethyleneimine polymer (1.0 g, 7.5 wt.-% solid content) was added. The air flow was stopped and the mixture was stirred for additional 2 minutes. The air flow was then turned on for 20 minutes (4 to 6 l/min). A pink/purple coloured foam comprising pink/purple ink particles appeared. Rapid decolourization of the water sample was observed, but lots of ink particles remain in suspension. Another 0.5 g of the modified polyethyleneimine polymer were added, which lead to formation of a colourless foam with ink particles on the surface. After 20 minutes, no more ink particle were observed at the surface. The flotation was stopped, and the different fractions (removed foam and clean water) were analysed. Waste (removed foam fraction): dark purple, V=200 ml, pH=8.5

Clean water: colourless with traces of small ink particles remaining in suspension, V=1.81, pH=8.3.

Step C: Filtration

The waste fraction was filtered by using a Buchner funnel (Whatman grade 589/3 qualitative filtration paper), washed with deionized water and dried under reduced pressure at 90° C. for 4 h. 0.9 g of purple/multicolour particles were recovered and analysed.

Analyses

IR

Figure 3:
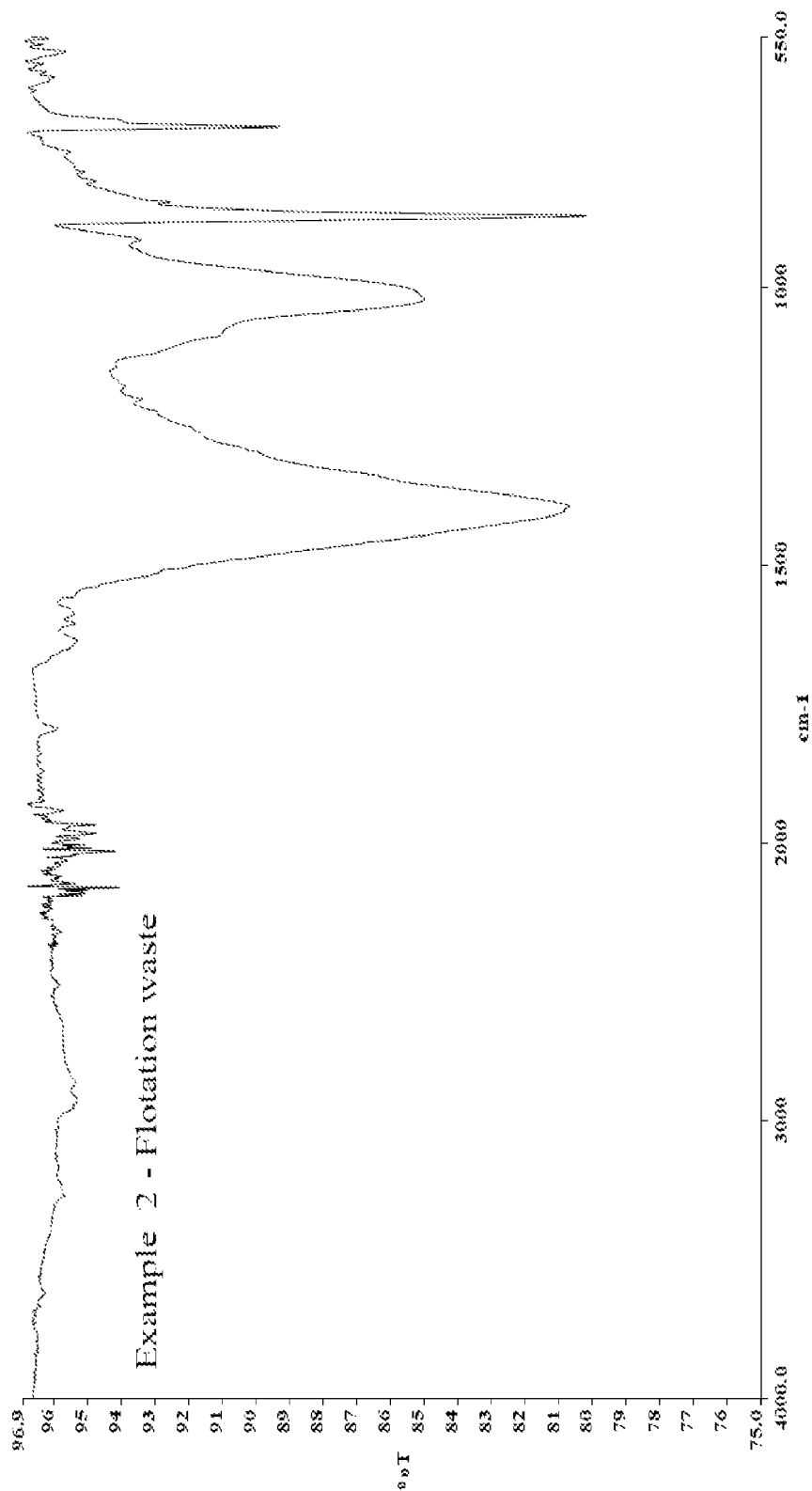
FIG. 3 shows FTIR spectra of one example waste faction in accordance with the invention.

The waste fraction showed a Peak at 1 000 cm$^{-1}$ that can be attributed to the bentonite (Si—O bond, see FIG. 3) and a peak at 1 400 cm$^{-1}$ that can be attributed to calcium carbonate.

UV/Vis

Figure 4:
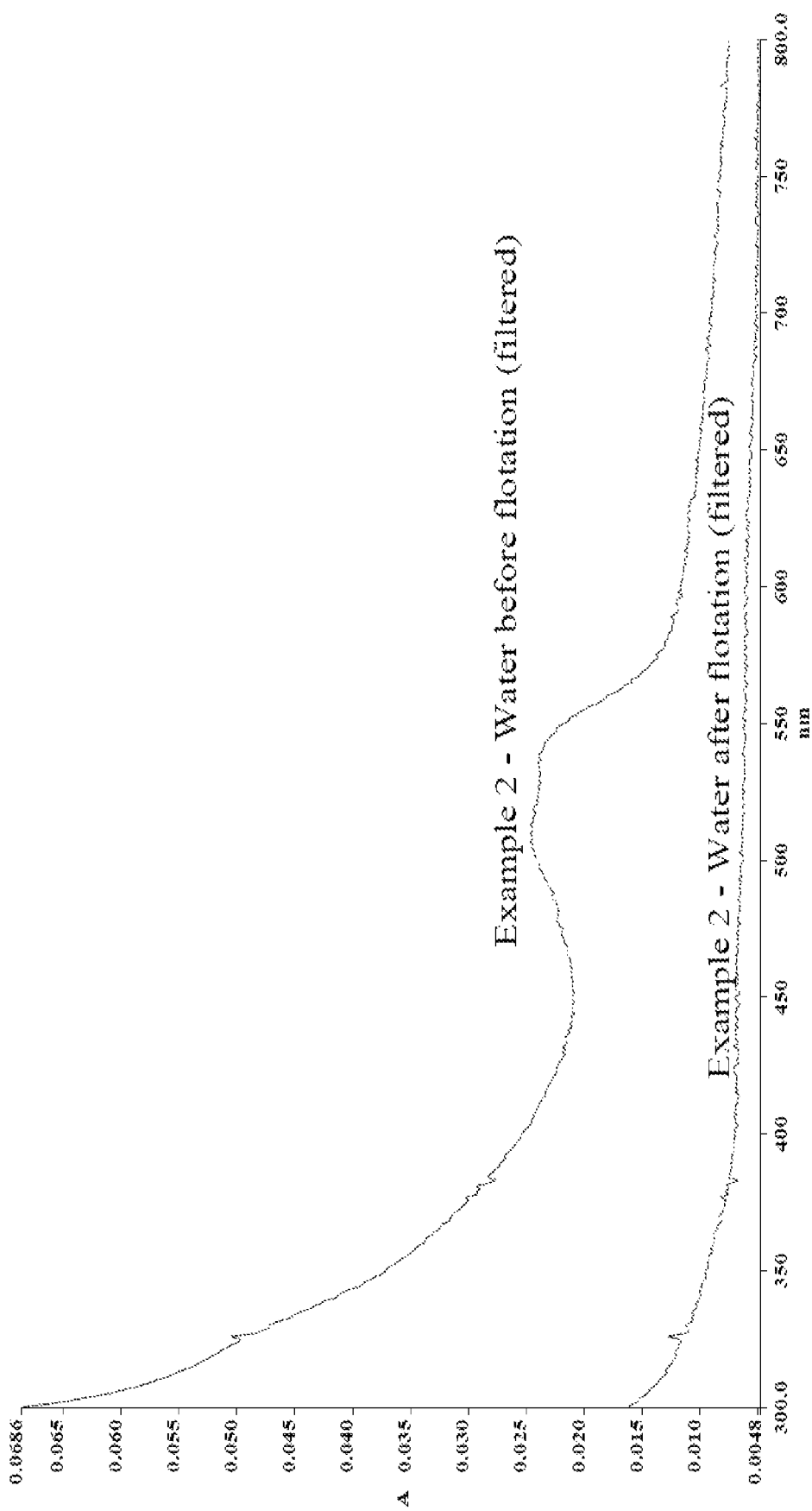
FIG. 4 shows the comparative UV-VIS spectra of one example of an aqueous suspension (filtered), both before and after flotation, in accordance with the invention.

FIG. 4 shows the UV-vis spectra of the aqueous suspension before and after the flotation (once filtered).

Spectrophotometry

Cyan density was measured on the blue-printed portions

Magenta density was measured on the red-printed portions

Black density was measured on the black-printed portions

Given values are an average of 10 measurements.

TABLE 7

Results of spectrophotometric evaluation.

| Sample | Cyan | Magenta | Black |
|---|---|---|---|
| Example 2/Printed paper 16 before step A | 1.6269 | 1.569 | 1.6735 |
| Example 2/Printed paper 16 after step A | 0.0292 | 0.0917 | 0.0468 |

Composition Analysis:

TABLE 8

Composition of different fractions.

| Fraction | Ash content [wt.-%] | Composition/Remarks |
|---|---|---|
| Printed paper 16 before step A | 36.8 | Mainly paper (cellulose), 30 wt.-% CaCO$_3$, 6 wt.-% Al-Silicates, coating binder |
| Printed paper 16 after step A | 29.7 | Mainly paper (cellulose), about 26 wt.-% CaCO$_3$, 4% Al-Silicates, coating binder |
| Waste collected after step B flotation | 85.2 | Mainly inorganic, most of it (>60%) CaCO$_3$, 20 wt.-% Al-Silicate |

TABLE 9

Composition of different fractions.

|  | Printed paper 16 before step A | Printed paper 16 after step A | Waste collected after step B flotation |
|---|---|---|---|
| CaO | 18.7 wt.-% | 14.5 wt.-% | 34.0 wt.-% |
| MgO | 0.98 wt.-% | 0.92 wt.-% | 1.48 wt.-% |
| $Al_2O_3$ | 0.96 wt.-% | 0.88 wt.-% | 3.33 wt.-% |
| $SiO_2$ | 2.31 wt.-% | 1.65 wt.-% | 10.6 wt.-% |
| $Fe_2O_3$ | 0.22 wt.-% | 0.10 wt.-% | 0.47 wt.-% |
| $TiO_2$ | 0.03 wt.-% | 0.02 wt.-% | 0.05 wt.-% |
| $SO_3$ | 0.07 wt.-% | 0.05 wt.-% | 0.07 wt.-% |
| $Na_2O$ | — | — | — |
| Others | 0.15 wt.-% | 0.08 wt.-% | 0.22 wt.-% |
| TGA 30-250° C. ($\rightarrow$water) | 0.16 wt.-% | 0.19 wt.-% | 35.0 wt.-% |
| TGA 250-1000° C. ($\rightarrow CO_2$) | 13.20 wt.-% | 11.31 wt.-% |  |
| Organic content | 63.2 wt.-% | 70.3 wt.-% | 14.7 wt.-% |

EXAMPLE 3

Deinking and Flotation of Printed Paper 6 (Comparative Example)

Step A): Ink Desorption from Paper

One A4 printed paper 16 sheet was dipped in a beaker (5 l) 2.2 l tap water and was left to stay without particular stirring during 10 minutes. No visible particles were released in the tap water, and no decolourization of the paper was observed. Only a slight pink colourization of water was observed.

Spectrophotometry

Cyan density was measured on the blue-printed portions

Magenta density was measured on the red-printed portions

Black density was measured on the black-printed portions

Given values are an average of 10 measurements.

TABLE 10

Results of spectrophotometric evaluation.

| Sample | Cyan | Magenta | Black |
|---|---|---|---|
| Example 3/Printed paper 6 before step A | 1.345 | 1.2581 | 1.5618 |
| Example 3/Printed paper 6 after step A | 1.2585 | 1.151 | 1.5339 |

EXAMPLE 4

Deinking and Flotation of Printed Paper 13 (Inventive Example)

Step A): Ink Desorption from Paper

One A4 printed paper 13 sheet was dipped in a beaker (5 l) in 2.2 l tap water. The mixture was regularly agitated during 10 minutes. The ink "slipped" slowly from the sheet in small platelets and the black colour was completely removed, whereas blue and red schemes leave slightly red/pink colour traces on the paper. Afterwards, the decolourized paper was removed from the beaker and the water with ink particles in suspension (slightly purple in colour and trouble aspect) were directly used for flotation purification. The pH of the obtained mixture was 7.9.

Step B): Purification by Flotation

Flotation was performed on an Outotec Labcell flotation device. 2l of the aqueous suspension obtained in step A) were placed in the flotation flask. The mixture was stirred for 2 minutes under air flow (55 Hz, 1 650 rpm, air flow: 4 to 6 l/min). After that period of time, a modified polyethyleneimine polymer (0.8 g, 11.0 wt.-% solid content) was added. The air flow was stopped and the mixture was stirred for additional 2 minutes. The air flow was then turned on for 20 minutes (4 to 6 l/min). A pink/purple coloured foam comprising pink/purple with large ink particles appeared. Rapid decolourization of the water sample was observed, but visible ink particles remain in suspension. Another 0.4 g of the modified polyethyleneimine polymer were added, which lead to formation of a colourless foam with ink particles on the surface. After 10 minutes complete decolourization occurred. The flotation was stopped, and the different fractions (removed foam and clean water) were analysed.

Waste (removed foam fraction): dark purple, V=300 ml, pH=8.2

Clean water: colourless, no significant amount of particles present, V=1.7 l, pH=8.0.

Step C: Filtration

The waste fraction was filtered by using a Buchner funnel (Whatman grade 589/3 qualitative filtration paper), washed with deionized water and dried under reduced pressure at 90° C. for 4 h. 0.28 g of purple/colour particles were recovered and analysed.

Analyses

IR

Figure 5:
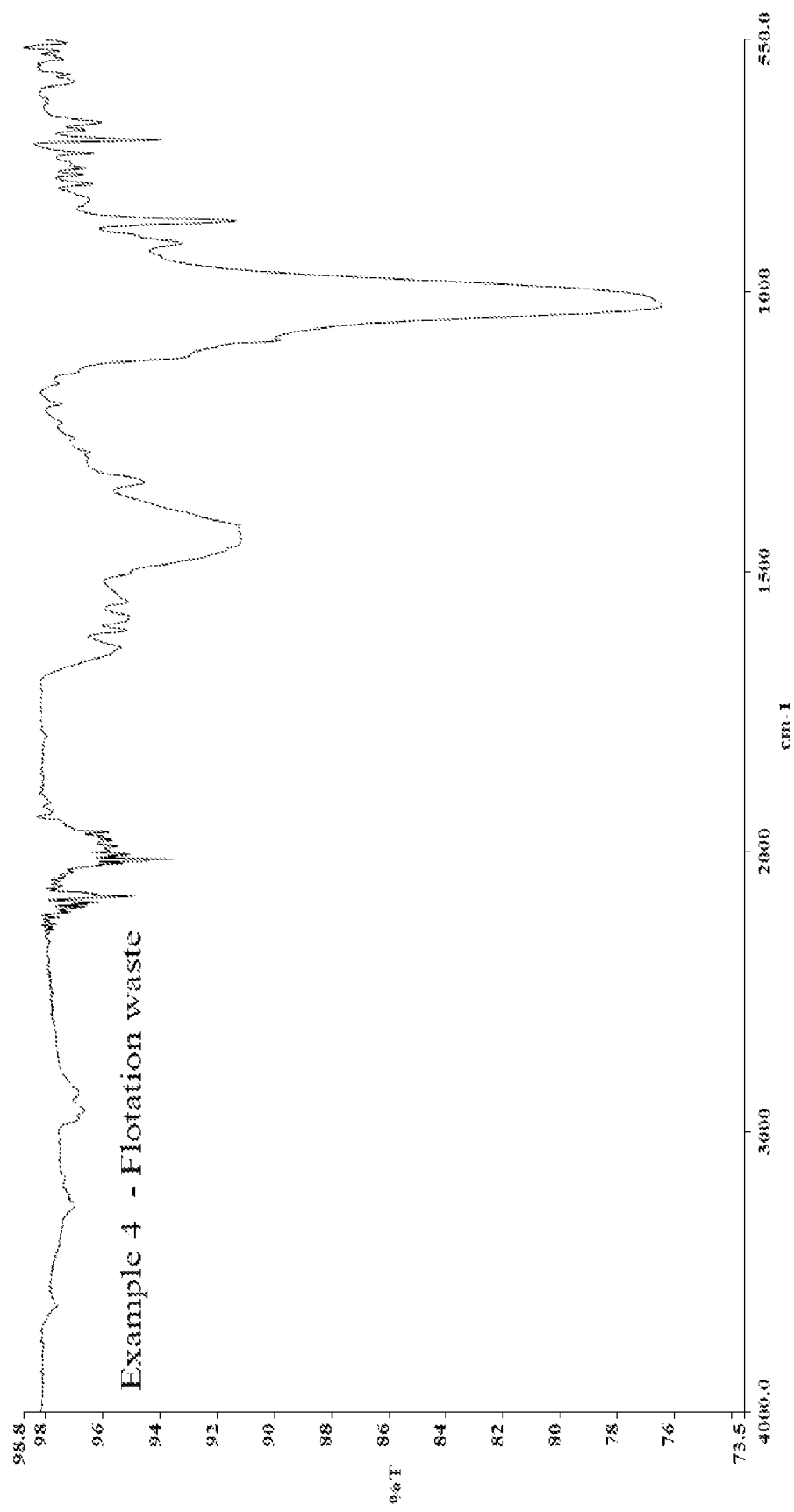
FIG. 5 shows FTIR spectra of one example waste faction in accordance with the invention.

The waste fraction showed a Peak around 1 000 cm$^{-1}$ that can be attributed to the bentonite (Si—O bond, see FIG. 5) and a peak around 1 400 cm-1 that can be attributed to calcium carbonate.

UV/Vis

Figure 6:
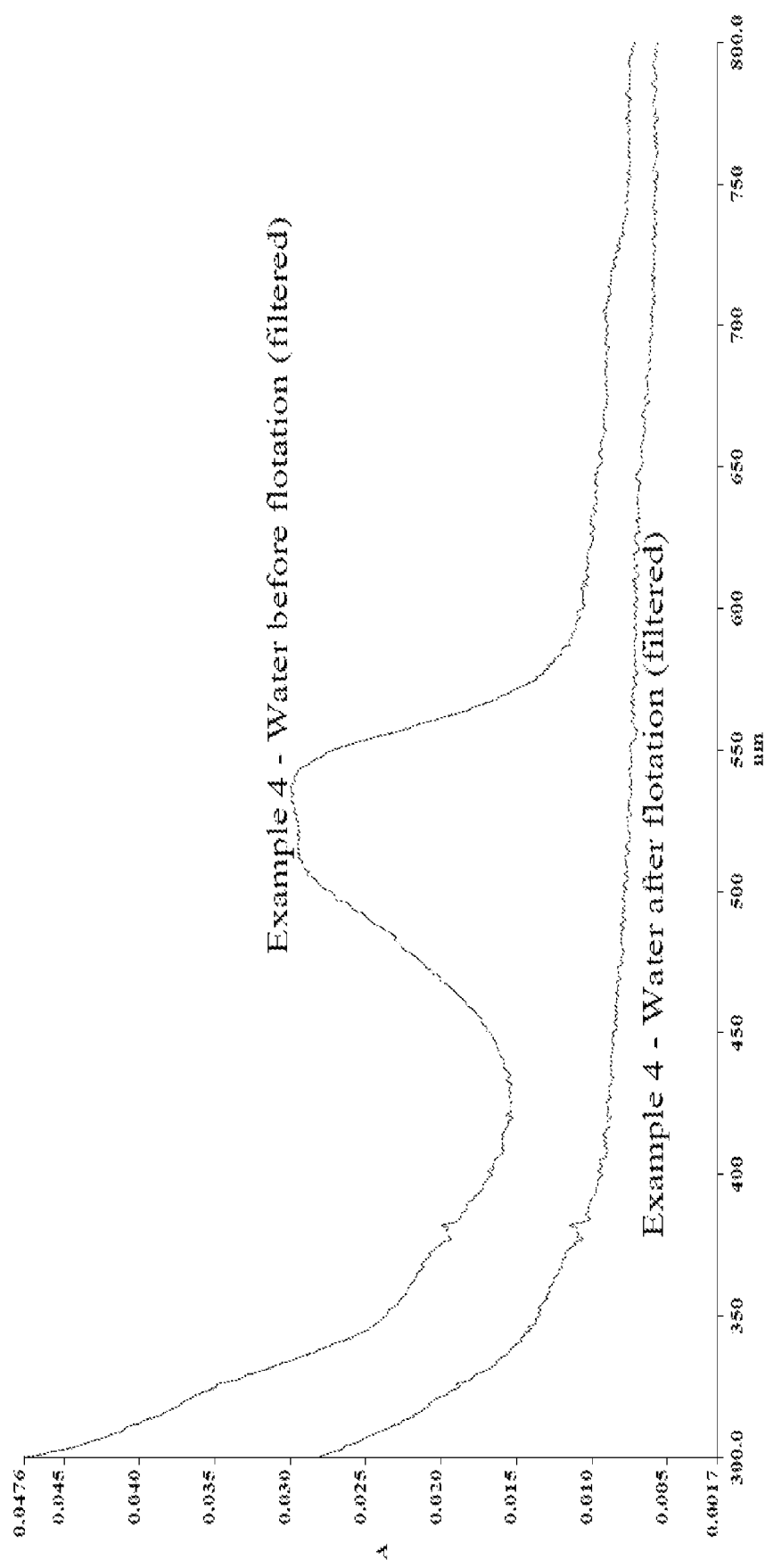
FIG. 6 shows the comparative UV-VIS spectra of one example of an aqueous suspension (filtered), both before and after flotation, in accordance with the invention.

FIG. 6 shows the UV-vis spectra of the aqueous suspension before and after the flotation.

Spectrophotometry

Cyan density was measured on the blue-printed portions

TABLE 11

Results of spectrophotometric evaluation.

| Sample | Cyan |
|---|---|
| Example 4/Printed paper 13 before step A | 1.5672 |
| Example 4/Printed paper 13 after step A | 0.0673 |

Ink Layer Thickness:

TABLE 12

Ink layer thickness before and after exposure to water.

| Sample | Average thickness (μm) | Standard deviation (μm) |
|---|---|---|
| Printed paper 13 before exposure to water | 3.5 | 1.1 |
| Printed paper 13 after exposure to water | no ink visible | — |
| Printed paper 10 before exposure to water | 1.9 | 0.7 |
| Printed paper 10 after exposure to water | no ink visible | — |

Composition Analysis:

TABLE 13

Composition of different fractions.

| Fraction | Ash content [wt.-%] | Composition/Remarks |
| --- | --- | --- |
| Printed paper 13 before step A | 30.2 | Mainly paper (cellulose), 25 wt.-% CaCO$_3$, 5 wt.-% Al-Silicates |
| Printed paper 13 after step A | 44.9 | Mainly inorganics, especially Al-silicates (30 wt.-%) and CaCO$_3$ (15 wt.-%) |

TABLE 14

Composition of different fractions.

| | Printed paper 13 before step A | Printed paper 13 after step A |
| --- | --- | --- |
| CaO | 13.26 wt.-% | 7.04 wt.-% |
| MgO | 1.00 wt.-% | 1.88 wt.-% |
| Al$_2$O$_3$ | 1.20 wt.-% | 6.00 wt.-% |
| SiO$_2$ | 2.60 wt.-% | 20.12 wt.-% |
| Fe$_2$O$_3$ | 0.09 wt.-% | 0.82 wt.-% |
| TiO$_2$ | 0.02 wt.-% | 0.08 wt.-% |
| SO$_3$ | 0.04 wt.-% | 0.14 wt.-% |
| Na$_2$O | 0.06 wt.-% | 0.40 wt.-% |
| Others | 0.07 wt.-% | 0.17 wt.-% |
| TGA 30-250° C. (→water) | 0.24 wt.-% | 1.59 wt.-% |
| TGA 250-1000° C. (→CO$_2$) | 11.63 wt.-% | 6.66 wt.-% |
| Organic content | 69.8 wt.-% | 55.1 wt.-% |

EXAMPLE 5

Deinking and Flotation of Printed Paper 14 (Inventive Example)

Step A): Ink Desorption from Paper

One A4 printed paper 14 sheet was dipped in a beaker (5 l) in 2.2 l tap water. The mixture was regularly agitated during 10 minutes. The ink "slipped" slowly from the sheet in small particles, pink colour traces remained on the paper from blue and especially from red printed areas. Afterwards, the decolourized paper was removed from the beaker and the water with ink particles in suspension was directly used for flotation purification. The pH of the obtained mixture was 7.4.

Step B): Purification by Flotation

Flotation was performed on an Outotec Labcell flotation device. 2 L of the aqueous suspension obtained in step A) were placed in the flotation flask. The mixture was stirred for 2 minutes under air flow (55 Hz, 1 650 rpm, air flow: 4 to 6 l/min). After that period of time, a modified polyethyleneimine polymer (0.8 g, 11.0 wt.-% solid content) was added. The air flow was stopped and the mixture was stirred for additional 2 minutes. The air flow was then turned on for 20 minutes (4 to 6 l/min). A pink/purple coloured foam comprising pink/purple with large ink particles appeared. Rapid decolourization of the water sample was observed, but visible ink particles remain in suspension. After 10 minutes another 0.6 g of the modified polyethyleneimine polymer were added, which lead to formation of a colourless foam with ink particles on the surface. After 10 minutes complete decolourization occurred, although some tiny dark particles (black) of ink remain in suspension. The flotation was stopped, and the different fractions (removed foam and clean water) were analysed.

Waste (removed foam fraction): dark purple, V=300 ml, pH=8.2

Clean water: colourless, no significant amount of particles present, V=1.7 l, pH=8.0.

Step C: Filtration

The waste fraction was filtered by using a Buchner funnel (Whatman grade 589/3 qualitative filtration paper), washed with deionized water and dried under reduced pressure at 90° C. for 4 h. 0.26 g of purple/colour particles were recovered and analysed.

Analyses

IR

Figure 7:
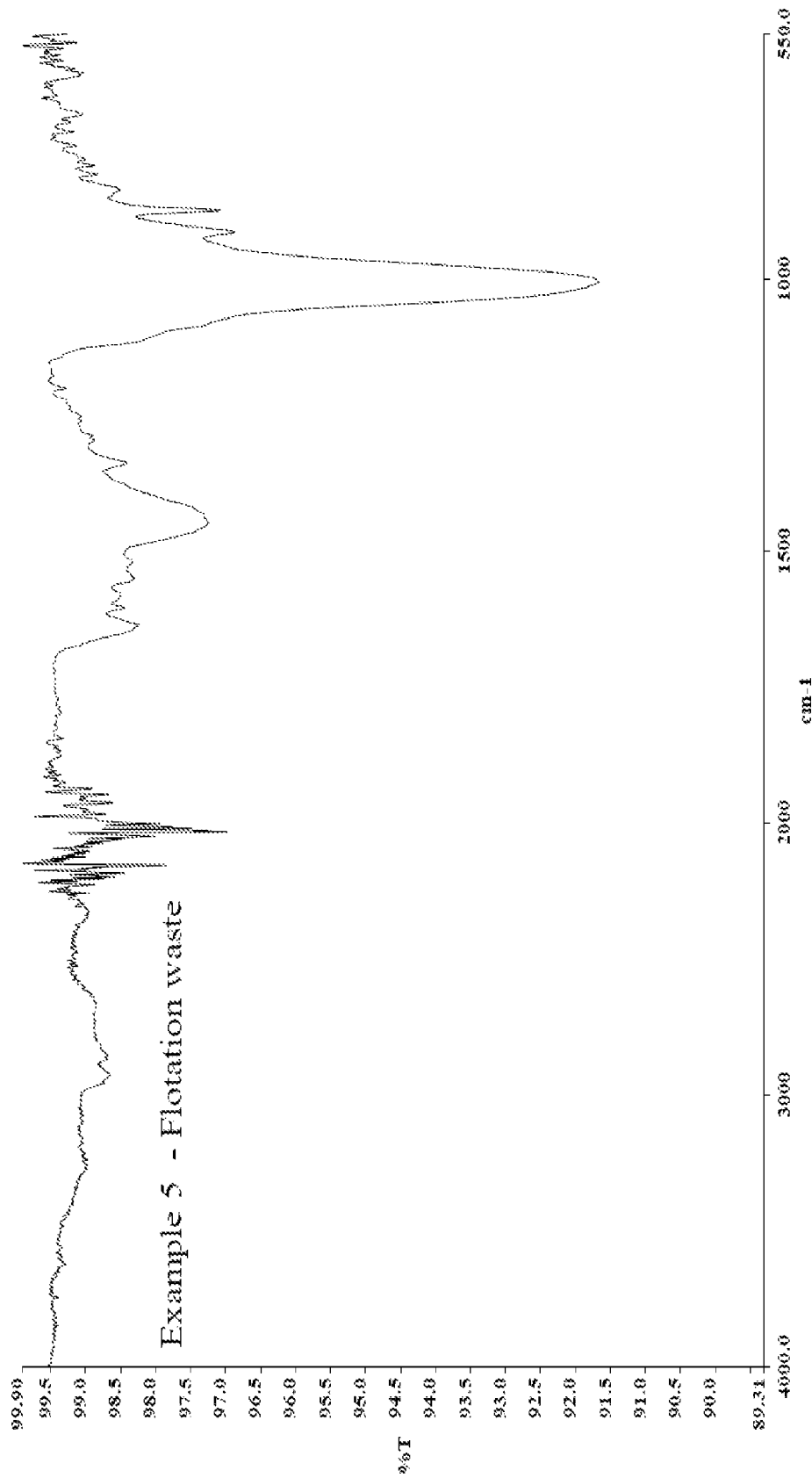
FIG. 7 shows FTIR spectra of one example waste faction in accordance with the invention.

The waste fraction showed a Peak at 1 000 cm$^{-1}$ that can be attributed to the bentonite (Si—O bond), (FIG. 7).

Spectrophotometry

Cyan density was measured on the blue-printed portions

Magenta density was measured on the red-printed portions

Black density was measured on the black-printed portions

Given values are an average of 10 measurements.

TABLE 15

Results of spectrophotometric evaluation.

| Sample | Cyan | Magenta | Black |
| --- | --- | --- | --- |
| Example 5/Printed paper 14 before step A | 1.55 | 1.52 (1.64 on blue sections) | 1.66 |
| Example 5/Printed paper 14 after step A | 0.084 | 0.267 (0.206 on blue sections) | 0.061 |

Composition Analysis

TABLE 16

Composition of different fractions.

| Fraction | Ash content [wt.-%] | Composition/Remarks |
| --- | --- | --- |
| Waste collected after step B flotation | 46.6 | Mainly organics (Cellulose), 31 wt.-% CaCO$_3$, 12 wt.-% Al-silicate |

TABLE 17

Composition of different fractions.

| | Waste collected after step B flotation |
| --- | --- |
| CaO | 4.34 wt.-% |
| MgO | 2.13 wt.-% |
| Al$_2$O$_3$ | 7.02 wt.-% |
| SiO$_2$ | 23.75 wt.-% |
| Fe$_2$O$_3$ | 0.89 wt.-% |
| TiO$_2$ | 0.08 wt.-% |
| SO$_3$ | 0.16 wt.-% |
| Na$_2$O | 0.33 wt.-% |
| Others | 0.27 wt.-% |
| TGA 30-250° C. (→water) | 2.42 wt.-% |
| TGA 250-1000° C. (→CO$_2$) | 5.17 wt.-% |
| Organic content | 53.4 wt.-% |

EXAMPLE 6

Deinking and Flotation of Printed Paper 6 (Comparative Example)

Step A): Ink Desorption from Paper:

One A4 printed paper 6 sheet is dipped in 2 l deionized water and left to stay without particular stirring during 10 minutes. No visible particles are released in water, and the paper does not decolourize. Only a slight pink colourization of water can be observed.

Spectrophotometry for Colour Evaluation:

Cyan density was measured on the blue-printed portions
Magenta density was measured on the red-printed portions
Black density was measured on the black-printed portions

TABLE 18

Results of spectrophotometric evaluation.

| Sample | Cyan | Magenta | Black |
|---|---|---|---|
| Example 6/Printed paper 6 before step A | 1.345 | 1.2581 | 1.5618 |
| Example 6/Printed paper 6 after step A | 1.2585 | 1.151 | 1.5339 |

EXAMPLE 7

Deinking and Flotation of Printed Paper 8 (Comparative Example)

Step A): Ink Desorption from Paper

One A4 printed paper 8 sheet was dipped in a beaker (5 l) in 2 l tap water and manually agitated regularly for 10 minutes. Almost no visible particles are released in water and the paper does not decolourize. Only a slight pink colourization of the tap water was observed. Afterwards, the paper sheet was removed from the beaker and the colour density measured on each section.

Spectrophotometry for Colour Evaluation

Cyan density was measured on the blue-printed portions
Magenta density was measured on the red-printed portions
Black density was measured on the black-printed portions
Given values are an average of 10 measurements.

TABLE 19

Results of spectrophotometric evaluation.

| Sample | Cyan | Magenta | Black |
|---|---|---|---|
| Example 7/Printed paper 8 before step A | 1.59 | 1.57 | 1.64 |
| Example 7/Printed paper 8 after step A | 1.41 | 1.36 | 1.43 |

EXAMPLE 8

Deinking and Flotation of Printed Paper 17 (Inventive Example)

Step A): Ink Desorption from Paper

One A4 printed paper 17 sheet was dipped in a beaker (5 l) in 2.2 l deionized water and was left to stay without particular stirring for 1 h. Some ink dissolved (blue colouration) and particles "slipped" from the sheet. After another 1 hour, the decolourized paper was removed from the beaker and colour traces can still be seen on the paper surface. The water (deep blue in colour) with ink particles in suspension (the particles sedimented rapidly) was directly used for flotation purification. The pH of the obtained mixture was 8.1.

Step B): Purification by Flotation

Flotation was performed on an Outotec Labcell flotation device. 2 l of the aqueous suspension obtained in step A) were placed in the flotation flask. The mixture was stirred for 2 minutes under air flow (55 Hz, 1 650 rpm, air flow: 4 to 6 l/min). After that period of time, a modified polyethyleneimine polymer (1.0 g, 7.5 wt.-% solid content) was added. The air flow was stopped and the mixture was stirred for additional 2 minutes. The air flow was then turned on for 10 minutes (4 to 6 l/min). A dark particles containing foam appeared, after 10 minutes reduced foaming was observed, although the sample remained quite coloured. Another 1 g (7.5 wt.-% solid content) of the modified polyethyleneimine polymer were added and the flotation was continued for another 10 minutes. Complete decolourization of the sample occurred, the sample was visually free from coloured particles but some trace amount of white particles remained in the suspension. The flotation was stopped, and the different fractions (removed foam and clean water) were analysed.

Waste (removed foam fraction): dark purple, V=300 ml, pH=8.3

Clean water: colourless, no significant amount of particles present, V=1.7 l, pH=7.6

Step C: Filtration

The waste fraction was filtered by using a Buchner funnel (Whatman grade 589/3 qualitative filtration paper), washed with deionized water and dried under reduced pressure at 90° C. for 4 h. 0.39 g of a grey powder were recovered and analysed.

Analyses

IR

Figure 8:
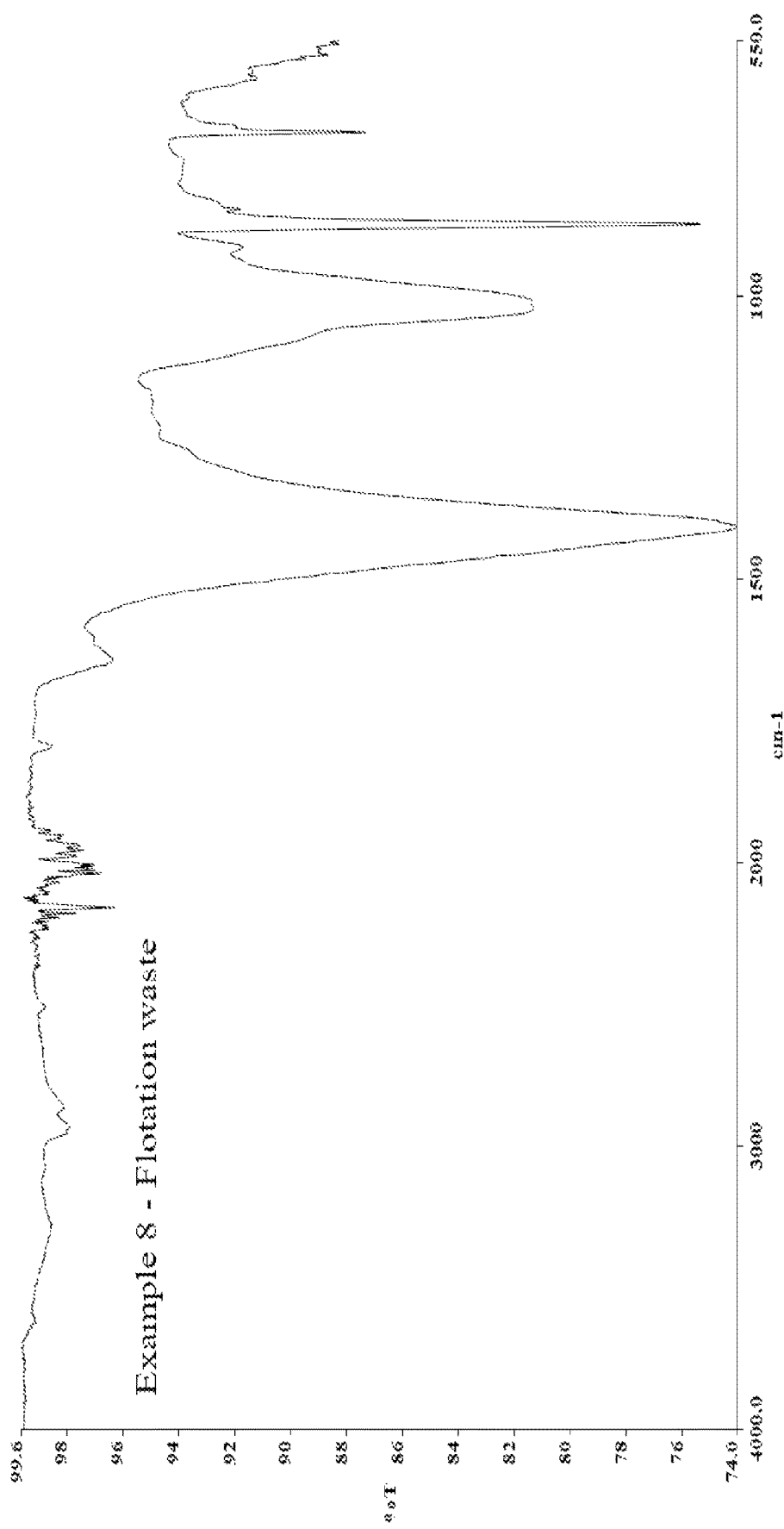
FIG. 8 shows FTIR spectra of one example waste faction in accordance with the invention.

The waste fraction showed a Peak at 1 000 $cm^{-1}$ that can be attributed to the bentonite (Si—O bond, see FIG. 8) and a peak at 1 400 $cm^{-1}$ that can be attributed to calcium carbonate.

UV/Vis

Figure 9:
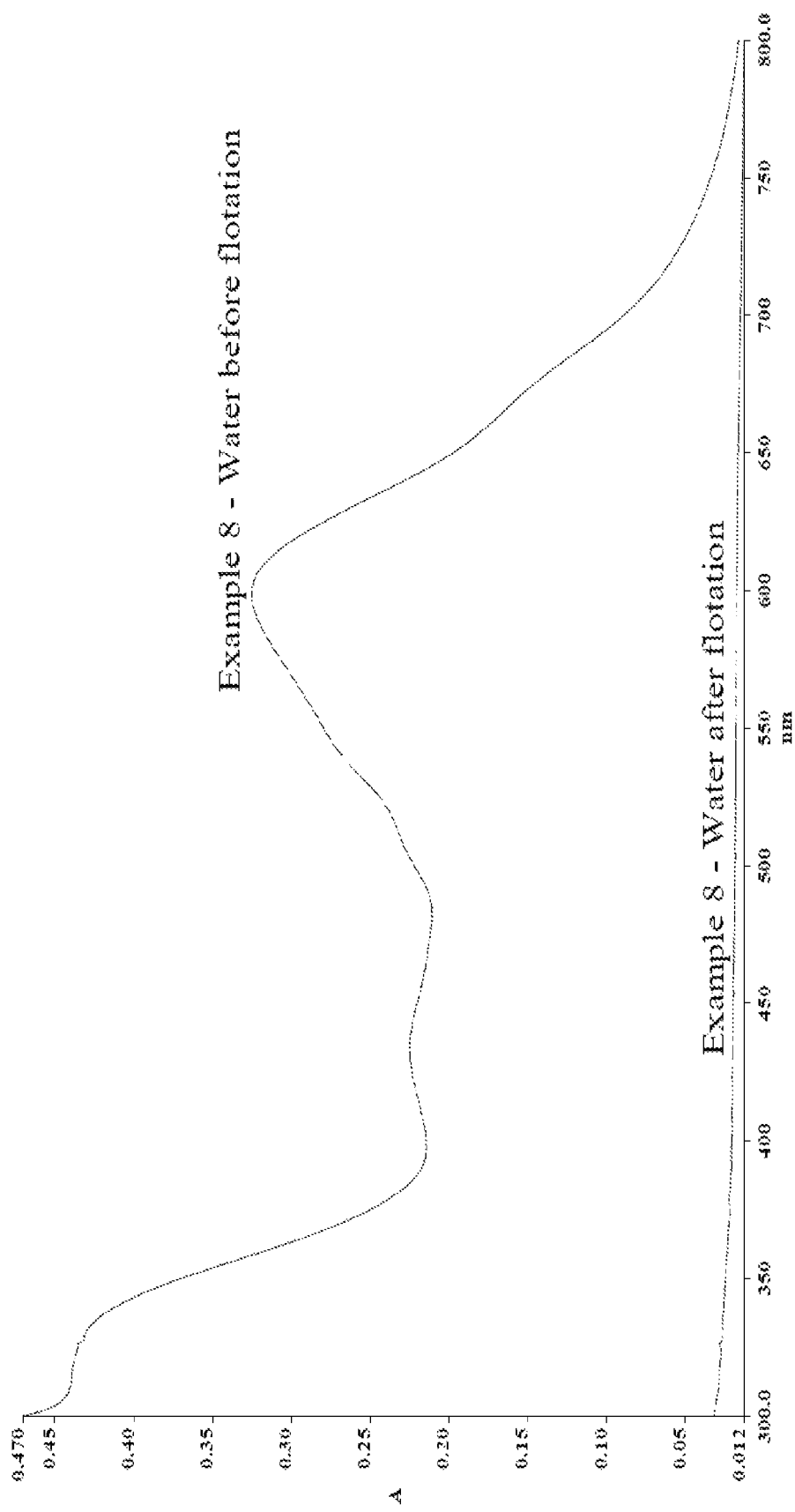
FIG. 9 shows the comparative UV-VIS spectra of one example of an aqueous suspension (filtered), both before and after flotation, in accordance with the invention.

FIG. 9 shows the UV-vis spectra of the aqueous suspension before and after the flotation.

Spectrophotometry

Cyan density was measured on the blue-printed portions
Magenta density was measured on the red-printed portions
Black density was measured on the black-printed portions
Given values are an average of 10 measurements.

TABLE 20

Results of spectrophotometric evaluation.

| Sample | Cyan | Magenta | Black |
|---|---|---|---|
| Example 8/Printed paper 17 before step A | 1.2388 | 0.9301 | 1.0467 |
| Example 8/Printed paper 17 after step A | 0.163 | 0.2073 | 0.2387 |

Composition Analysis

TABLE 21

Composition of different fractions.

| Fraction | Ash content [wt.-%] | Composition/Remarks |
|---|---|---|
| Printed paper 17 before step A | 30.1 | Mainly coated paper (cellulose) & coating binders, 27 wt.-% $CaCO_3$, 3 wt.-% Al-Silicates |

TABLE 21-continued

Composition of different fractions.

| Fraction | Ash content [wt.-%] | Composition/Remarks |
|---|---|---|
| Flotation waste after step B | 67.5 | 43 wt.-% $CaCO_3$ and 26 wt.-% Al-Silicates, organic polymers |

TABLE 22

Composition of different fractions.

| | Printed paper 17 before step A | Flotation waste after step B |
|---|---|---|
| CaO | 14.1 wt.-% | 22.8 wt.-% |
| MgO | 0.95 wt.-% | 1.54 wt.-% |
| $Al_2O_3$ | 0.93 wt.-% | 4.28 wt.-% |
| $SiO_2$ | 1.78 wt.-% | 15.3 wt.-% |
| $Fe_2O_3$ | 0.09 wt.-% | 0.81 wt.-% |
| $TiO_2$ | 0.02 wt.-% | 0.08 wt.-% |
| $SO_3$ | 0.04 wt.-% | 0.93 wt.-% |
| $Na_2O$ | — | — |
| Others | 0.11 wt.-% | 0.42 wt.-% |
| TGA 30-250° C. (→water) | 0.15 wt.-% | 1.28 wt.-% |
| TGA 250-1000° C. (→$CO_2$) | 11.93 wt.-% | 20.07 wt.-% |
| Organic content | 69.9 wt.-% | 32.5 wt.-% |

EXAMPLE 9

Deinking and Flotation of Printed Paper 7 (Comparative Example)

Step A): Ink Desorption from Paper

One A4 printed paper 7 sheet was dipped in a beaker (5 l) in 2.2 l deionized water and was left to stay without particular stirring for 1 h. Some ink dissolved and particles got into the water (dissolution and suspension). After another 1 hour, the decolourized paper was removed from the beaker and colour traces can still be seen on the paper surface. The water (deep blue in colour) with ink particles in suspension (the particles sedimented rapidly) was directly used for flotation purification. The pH of the obtained mixture was 7.9.

Step B): Purification by Flotation

Flotation was performed on an Outotec Labcell flotation device. 2 L of the aqueous suspension obtained in step A) were placed in the flotation flask. The mixture was stirred for 2 minutes under air flow (55 Hz, 1 650 rpm, air flow: 4 to 6 l/min). After that period of time, a modified polyethyleneimine polymer (1.0 g, 7.5 wt.-% solid content) was added. The air flow was stopped and the mixture was stirred for additional 2 minutes. The air flow was then turned on for 10 minutes (4 to 6 l/min). A dark particles containing foam appeared, after 10 minutes reduced foaming was observed, although the sample remained quite coloured. Another 1 g (7.5 wt.-% solid content) of the modified polyethyleneimine polymer were added and the flotation was continued for another 10 minutes. After that time the water sample was almost colourless (slight blue colour). The flotation was stopped, and the different fractions (removed foam and clean water) were analysed.

Waste (removed foam fraction): dark purple, V=200 ml, pH=7.3

Clean water: colourless, no significant amount of particles present, V=1.8 l, pH=7.2.

Analyses

Spectrophotometry

Cyan density was measured on the blue-printed portions

Magenta density was measured on the red-printed portions

Black density was measured on the black-printed portions

Given values are an average of 10 measurements.

TABLE 23

Results of spectrophotometric evaluation.

| Sample | Cyan | Magenta | Black |
|---|---|---|---|
| Example 9/Printed paper 7 before step A | 1.0821 | 0.7461 | 1.028 |
| Example 9/Printed paper 7 after step A | 0.2254 | 0.2739 | 0.3384 |

Composition Analysis

TABLE 24

Composition of different fractions.

| Fraction | Ash content [wt.-%] | Composition/Remarks |
|---|---|---|
| Printed paper 7 after step A | 28.7 | Mainly coated paper (cellulose) and coating binders, 27 wt.-% $CaCO_3$, 2.5 wt.-% Al-Silicates |

TABLE 25

Composition of different fractions.

| | Printed paper 7 after step A |
|---|---|
| CaO | 15.0 wt.-% |
| MgO | 0.95 wt.-% |
| $Al_2O_3$ | 0.75 wt.-% |
| $SiO_2$ | 1.22 wt.-% |
| $Fe_2O_3$ | 0.07 wt.-% |
| $TiO_2$ | 0.02 wt.-% |
| $SO_3$ | 0.06 wt.-% |
| $Na_2O$ | — |
| Others | 0.13 wt.-% |
| TGA 30-250° C. (→water) | 0.10 wt.-% |
| TGA 250-1000° C. (→$CO_2$) | 12.71 wt.-% |
| Organic content | 69.0 wt.-% |

EXAMPLE 10

Deinking and Flotation of Paper 15 (Inventive Example)

Step A): Ink Desorption from Paper

One A4 printed paper 15 sheet was dipped in a beaker (5 l) in 2.2 l tap water and was left to stay without particular stirring for 1 h. The paper was relatively hydrophobic and ink went off after paper was really wet and manual agitation was required to remove the ink layer. After 10 minutes the decolourized paper was removed from the beaker and the coloured water with dispersed ink particles was directly used for flotation purification. The pH of the obtained mixture was 7.4.

Step B): Purification by Flotation

Flotation was performed on an Outotec Labcell flotation device. 2 l of the aqueous suspension obtained in step A) were placed in the flotation flask. The mixture was stirred for 2 minutes under air flow (55 Hz, 1 650 rpm, air flow: 4 to 6 l/min). After that period of time, a modified polyethyleneimine polymer (0.8 g, 11 wt.-% solid content) was added. The air flow was stopped and the mixture was stirred for additional 2 minutes. The air flow was then turned on for 10 minutes (4 to 6 l/min). An almost colourless foam appeared containing the blue ink particles. Another 0.6 g (7.5 wt.-% solid content) of the modified polyethyleneimine polymer were added and the flotation was continued for another 10 minutes. After that time the water sample was almost colourless and free from particles. The flotation was stopped after a total time of 20 minutes, and the different fractions (removed foam and clean water) were analysed.

Waste (removed foam fraction): blue-coloured water and particles, V=300 ml, pH=8.1

Clean water: colourless, no significant amount of particles present, V=1.7 l, pH=8.1.

Step C: Filtration

The waste fraction was filtered by using a Buchner funnel (Whatman grade 589/3 qualitative filtration paper), washed with deionized water and dried under reduced pressure at 90° C. for 4 h. 0.25 g of blue and white particles were recovered and analysed. The "clean" fraction from the flotation was also filtered and no residue was collected on filter.

IR

Figure 10:
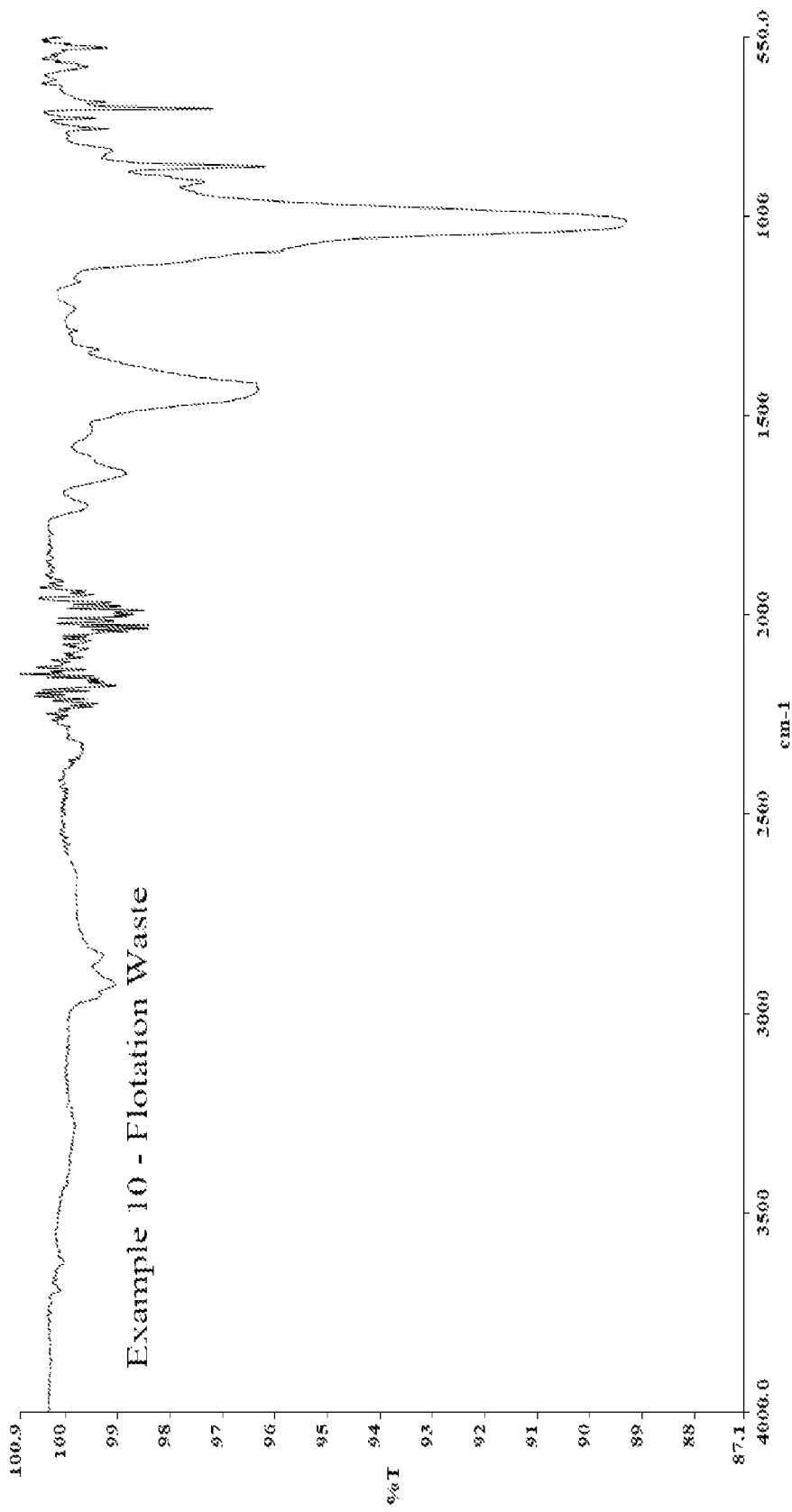
FIG. 10 shows FTIR spectra of one example waste faction in accordance with the invention.

The waste fraction showed a Peak at 1 000 cm$^{-1}$ that can be attributed to the bentonite (FIG. 10).

Spectrophotometry

Cyan density was measured on the blue-printed portions Given values are an average of 10 measurements.

TABLE 26

Results of spectrophotometric evaluation.

| Sample | Cyan |
| --- | --- |
| Example 10/Printed paper 15 before step A | 1.9468 |
| Example 10/Printed paper 15 after step A | 0.0462 |

Composition Analyses

TABLE 27

Composition of different fractions.

| Fraction | Ash content [wt.-%] | Composition/Remarks |
| --- | --- | --- |
| Printed paper 15 after step A | 28.4 | Mainly paper (cellulose), ash contains 25 wt.-% CaCO$_3$ and 4 wt.-% clay |
| Printed paper 15 before step A | 45.2 | Enrichment of inorganics, contains 10 wt.-% CaCO$_3$ and 35 wt.-% Al-Silicates |

TABLE 28

Composition of different fractions.

| | Printed paper 15 after step A | Waste collected after step B |
| --- | --- | --- |
| CaO | 13.55 wt.-% | 6.06 wt.-% |
| MgO | 1.00 wt.-% | 1.85 wt.-% |

TABLE 28-continued

Composition of different fractions.

| | Printed paper 15 after step A | Waste collected after step B |
| --- | --- | --- |
| Al$_2$O$_3$ | 0.86 wt.-% | 6.06 wt.-% |
| SiO$_2$ | 1.59 wt.-% | 22.77 wt.-% |
| Fe$_2$O$_3$ | 0.08 wt.-% | 0.84 wt.-% |
| TiO$_2$ | 0.02 wt.-% | 0.08 wt.-% |
| SO$_3$ | 0.04 wt.-% | 0.09 wt.-% |
| Na$_2$O | 0.04 wt.-% | 0.09 wt.-% |
| Others | 0.07 wt.-% | 0.30 wt.-% |
| TGA 30-250° C. ($\rightarrow$water) | 0.22 wt.-% | 1.66 wt.-% |
| TGA 250-1000° C. ($\rightarrow$CO$_2$) | 10.90 wt.-% | 5.34 wt.-% |
| Organic content | 71.6 wt.-% | 54.8 wt.-% |

Ink Layer Thickness:

TABLE 29

Ink layer thickness before and after exposure to water.

| Sample | Average thickness (μm) | Standard deviation (μm) |
| --- | --- | --- |
| Printed paper 15 before exposure to water | 3.8 | 2.4 |
| Printed paper 15 after exposure to water | no ink visible | — |
| Printed paper 12 before exposure to water | 2.6 | 0.7 |
| Printed paper 12 after exposure to water | no ink visible | — | was measured at 4 different spots on each image. The size of the pixel was 0.13 μm.

EXAMPLE 11

Deinking and Flotation of Paper 9, (Comparative Example)

Step A): Ink Desorption from Paper 6.5 paper bands from paper 9 (dimension 21×215 mm$^2$) were dipped in a beaker (5 l) in 2.2 l tap water and was left to stay without particular stirring for 1 h. The paper was relatively hydrophobic and ink went off after paper was really wet and manual agitation for 10 minutes was required to remove the ink layer. Nothing came off the paper, after 10 minutes the decolourized paper was removed from the beaker. The water was completely clear and all the ink remained on the paper.

Spectrophotometry

Cyan density was measured on the blue-printed portions

Given values are an average of 10 measurements.

TABLE 30

Results of spectrophotometric evaluation.

| Sample | Cyan |
| --- | --- |
| Example 11/Printed paper 9 before step A | 2.123 |
| Example 11/Printed paper 9 after step A | 2.007 |

The invention claimed is:

1. A process for the deinking of coated paper or paperboard, comprising the following steps:
   (i) providing a coated paper or paperboard comprising,
      (a) at least one layer consisting of a coating composition comprising,
         (a1) a calcium- or magnesium-exchanged clay, and
         (a2) a binder, wherein the content of the binder in the coating composition is in the range from 0.1 to 12 wt %, based on the total solids weight of the coating composition;
      (b) at least one layer having a thickness in the range from 0.1 to 10 μm comprising ink, wherein layer (a) is deposited on the paper or paperboard before layer (b);
   (ii) activating the calcium- or magnesium-exchanged clay of the coating composition layer during step (iii) by,
      providing in step (i) the binder, wherein the binder is soluble in water and comprises monovalent ions selected from the group consisting of sodium, lithium, potassium, ammonium and mixtures thereof, and
   (iii) treating the coated paper or paperboard as provided in step (i) with water to obtain an aqueous suspension comprising at least ink, clay particles and a paper pulp or a paper residue.

2. The process according to claim 1, wherein the process comprises a further step (iv) of separating the paper pulp or a paper residue from the aqueous suspension obtained in step (iii).

3. The process according to claim 1, wherein the clay is a calcium-exchanged nanoclay selected from the group consisting of bentonite, smectite, montmorillonite and mixtures thereof and preferably is bentonite.

4. The process according to claim 1, wherein the activating step (ii) further comprises,
   carrying out step (iii) with water comprising monovalent ions selected from the group consisting of sodium, lithium, potassium, ammonium and mixtures thereof; and/or
   adding sodium ions in the form of a salt selected from the group consisting of sodium chloride, sodium nitrate, sodium sulphate, sodium carbonate and mixtures-thereof before or during step (iii), and after step (i).

5. The process according to claim 1, wherein the binder is water soluble carboxymethylcellulose and comprises an excess of sodium ions with respect to the calcium or magnesium ions of the calcium- or magnesium-exchanged clay.

6. The process according to claim 1, wherein the coated paper comprises at least one layer (c) comprising 1 to 30 g/m² of a calcium carbonate-comprising material, wherein layer (c) is arranged between layer (a) and layer (b).

7. The process according to claim 6, wherein the calcium carbonate-comprising material is selected from ground calcium carbonate, precipitated calcium carbonate, surface-modified calcium carbonate, or a mixture thereof.

8. The process according to claim 6, wherein the calcium carbonate-comprising material is from a natural calcium carbonate source, said natural calcium carbonate source selected from the group consisting of marble, limestone, chalk, dolomite, and mixtures thereof.

9. The process according to claim 1, wherein the thickness of the at least one ink layer is in the range from 0.75 to 5 μm.

10. The process according to claim 1, wherein the water applied in step (iii) is selected from the group consisting of tap water, tap water comprising sodium ions, deionized water and mixtures thereof.

11. The process according to claim 1, wherein the content of the calcium- or magnesium-exchanged clay in the coating composition is in the range from 3 to 15 wt-%, based on the total weight of the coating composition, and/or the coating weight of the at least one layer (a) is from 0.1 to 20 g/m².

12. The process according to claim 1, wherein the content of the binder in the coating composition is in the range from 0.2 to 5 wt.-% based on the total solids weight of the coating composition.

13. The process according to claim 1, wherein the ink in layer (b) is a digital printing ink selected from the group consisting of ink- or dye-based inkjet inks, laser printing inks and/or toners, offset inks, flexographic inks, rotogravure inks and mixtures thereof.

14. The process according to claim 2, wherein the process further comprises the steps of
   (v) transferring the aqueous suspensions as obtained in step (iii) or (iv) to a flotation cell, and/or
   (vi) adding at least one collector agent to the aqueous suspensions as obtained in step (iii), (iv) or (v), and
   (vii) passing a flotation gas into the aqueous suspension formed in step (vi) to obtain a phase comprising water and a froth comprising clay and ink, and
   (viii) separating the froth as obtained in step (vii) from the water.

15. The process according to claim 14, wherein the at least one collector agent is selected from the group consisting of modified poylethyleneimines, active and hydrophobic tensides, alkyl sulphates, polyalkylenimines, primary amines, tertiary amines, quaternary amines, fatty amines, esterquats, polyesterquats, imidazolines, and quaternary imidazolium compounds.

16. The process according to claim 14, wherein the content of the at least one collector agent is in the range from 0.001 to 50 wt.-% based on the total weight of the solids in the aqueous suspension as provided in step (iii) or (iv).

17. A process for the deinking of coated paper or paperboard, comprising the following steps:
   providing a coated paper or paperboard comprising,
      (a) at least one layer consisting of a coating composition comprising,
         (a1) a calcium- or magnesium-exchanged clay,
         (a2) a binder,
      (b) at least one layer having a thickness in the range from 0.1 to 10 μm comprising ink,
      wherein layer (a) is deposited on the paper or paperboard before layer (b); and
   (ii) activating the calcium- or magnesium-exchanged clay by,
      (A) carrying out step (iii) with water comprising monovalent ions selected from the group consisting of sodium, lithium, potassium, ammonium and mixtures thereof, and/or
      (B) providing the binder in step (i), wherein the binder is soluble in water and comprises monovalent ions selected from the group consisting of sodium, lithium, potassium, ammonium and mixtures thereof, and/or
      (C) adding monovalent ions selected from the group consisting of sodium, lithium, potassium, ammonium and mixtures thereof in form of a salt, wherein the salt is introduced before or during step (iii), and after step (i); and (iii) treating the coated paper or paperboard provided in step (i) with water to obtain an aqueous suspension comprising at least ink, clay particles and a paper pulp or a paper residue, wherein mechanical scraping of the surface of the paper or paperboard is carried out during step (iii).

18. The process according to claim 17, wherein the coated paper or paperboard comprises at least one layer (c) comprising a calcium carbonate-comprising material, wherein layer (c) is arranged between layer (a) and layer (b).

19. The process according to claim 17, wherein the ink in layer (b) is a digital printing ink selected from the group consisting of ink- or dye-based inkjet inks, laser printing inks and/or toners, offset inks, flexographic inks, rotogravure inks and mixtures thereof.

20. The process according to claim 1, wherein the binder is water soluble and comprising an excess of sodium ions with respect to the calcium or magnesium ions of the calcium- or magnesium-exchanged clay in the range from 10:1 to 100,000:1.

* * * * *